United States Patent
Aoyama et al.

(10) Patent No.: US 8,400,965 B2
(45) Date of Patent: Mar. 19, 2013

(54) RADIO BASE STATION APPARATUS AND SYNCHRONIZATION METHOD THEREOF

(75) Inventors: Yutaka Aoyama, Kawasaki (JP); Shigeaki Kawamata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 513 days.

(21) Appl. No.: 12/694,158

(22) Filed: Jan. 26, 2010

(65) Prior Publication Data

US 2010/0246487 A1    Sep. 30, 2010

(30) Foreign Application Priority Data

Mar. 24, 2009    (JP) .................................. 2009-071996

(51) Int. Cl.
*H04W 4/00* (2009.01)
*H04B 7/216* (2006.01)
*H04B 7/212* (2006.01)

(52) U.S. Cl. .......................... 370/328; 370/335; 370/347

(58) Field of Classification Search .......................... None
See application file for complete search history.

(56) References Cited

U.S. PATENT DOCUMENTS 6,335,931 B1 * 1/2002 Strong et al. .................. 370/390
7,840,228 B2   11/2010 Suemitsu et al.
2005/0207387 A1 * 9/2005 Middleton et al. ............ 370/347
2010/0158051 A1 * 6/2010 Hadzic et al. ................. 370/503

FOREIGN PATENT DOCUMENTS

| JP | 2005-236529 | | 9/2005 |
| JP | 2008-516503 | A | 5/2008 |
| JP | 2009-049591 | | 3/2009 |
| WO | WO-2006/040653 | | 4/2006 |
| WO | WO 2006/082628 | A1 | 8/2006 |

OTHER PUBLICATIONS

Ericsson AB, Huawei Technologies Co. Ltd, NEC Corporation, Nortel Networks Ltd, Alcatel Lucent, and Nokia Siemens Networks GmbH & Co. KG.; CPRI Specification V4.0 (Jun. 30, 2008) *Interface Specification*, pp. 1-91.
Japanese Office Action mailed Jan. 8, 2013 for corresponding Japanese Application No. 2009-071996, with English-language translation.

* cited by examiner

*Primary Examiner* — Ian N Moore
*Assistant Examiner* — Brian T Le
(74) *Attorney, Agent, or Firm* — Fujitsu Patent Center

(57) ABSTRACT

In a radio base station apparatus that connects a radio control device and plural radio devices to each other through plural links and transmits and receives data by using a frame, a synchronization unit calculates a difference between a first reference counter and a second reference counter from first and second transmission values and first and second reception values and corrects a count value of the second reference counter based on the difference so as to make the count value of the second reference counter coincide with a count value of the first reference counter.

10 Claims, 31 Drawing Sheets

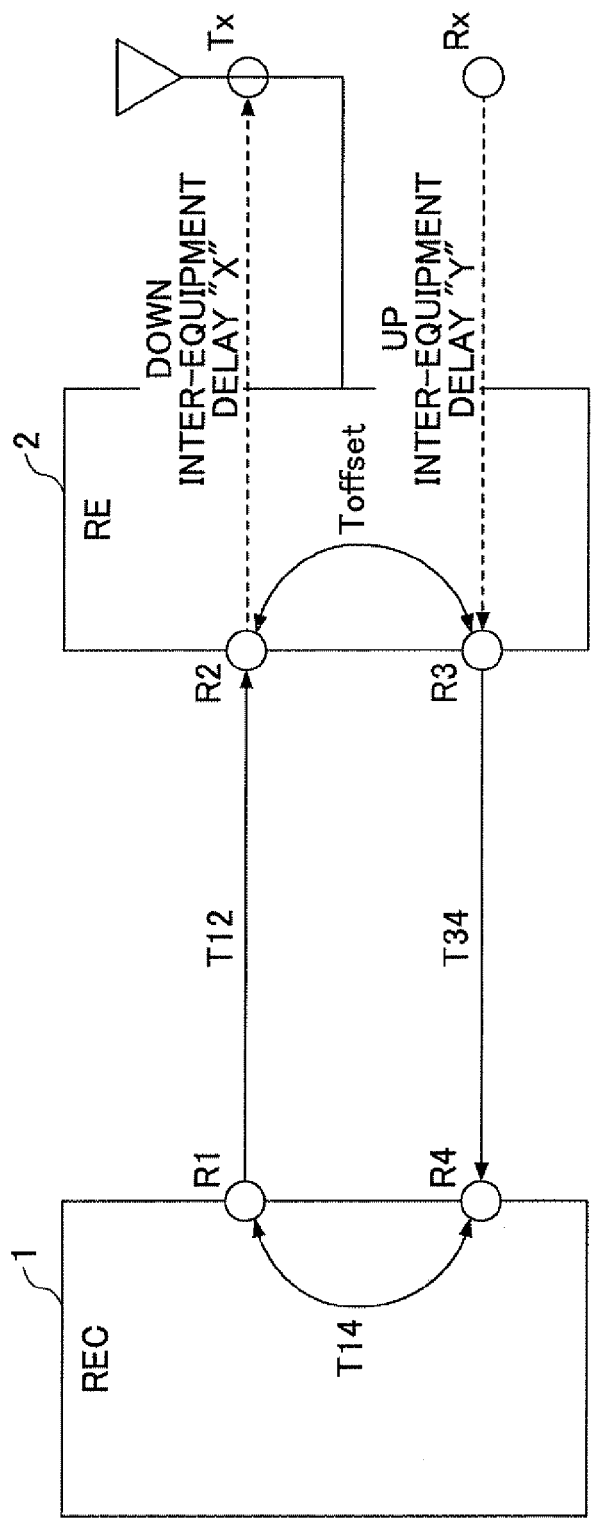

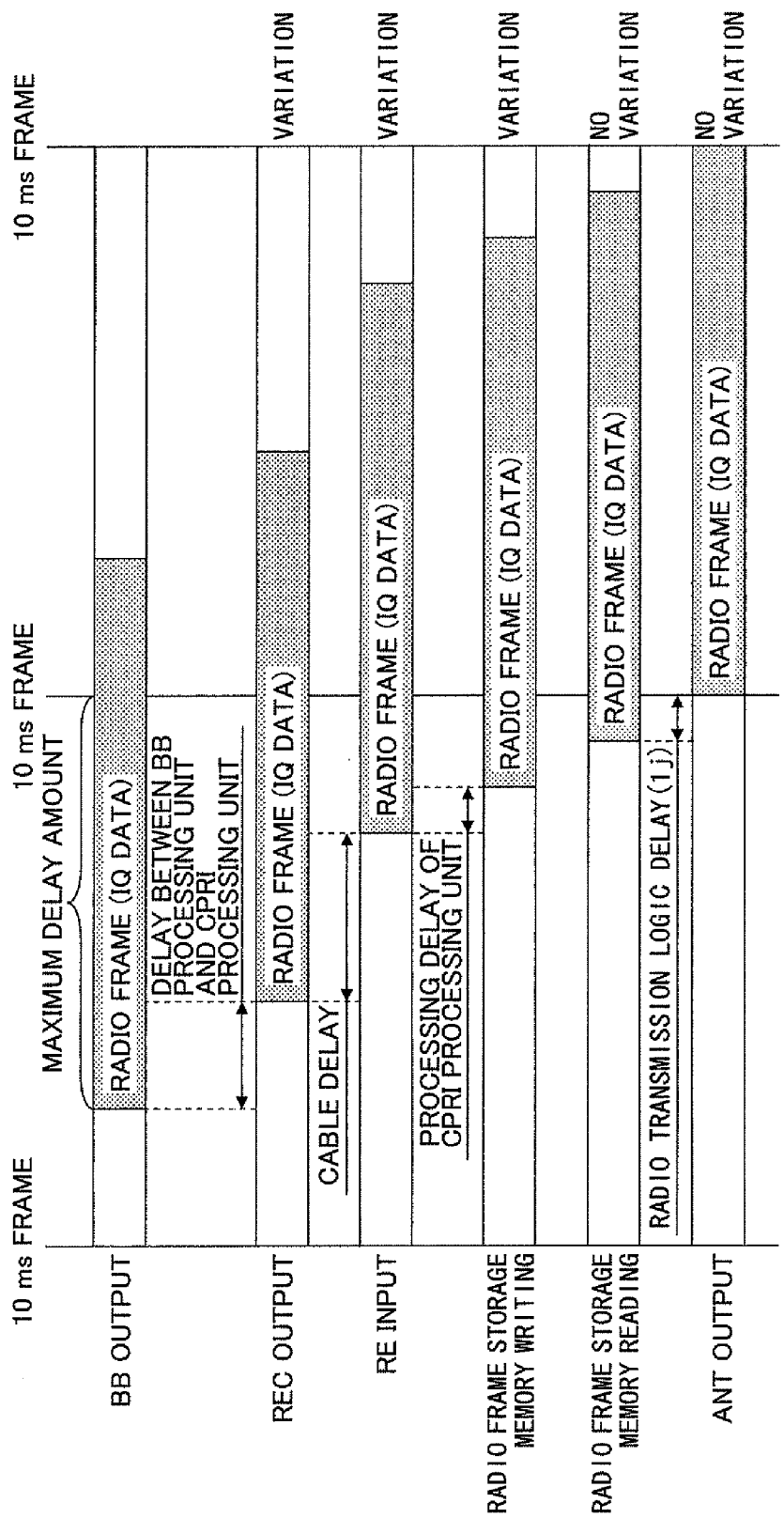

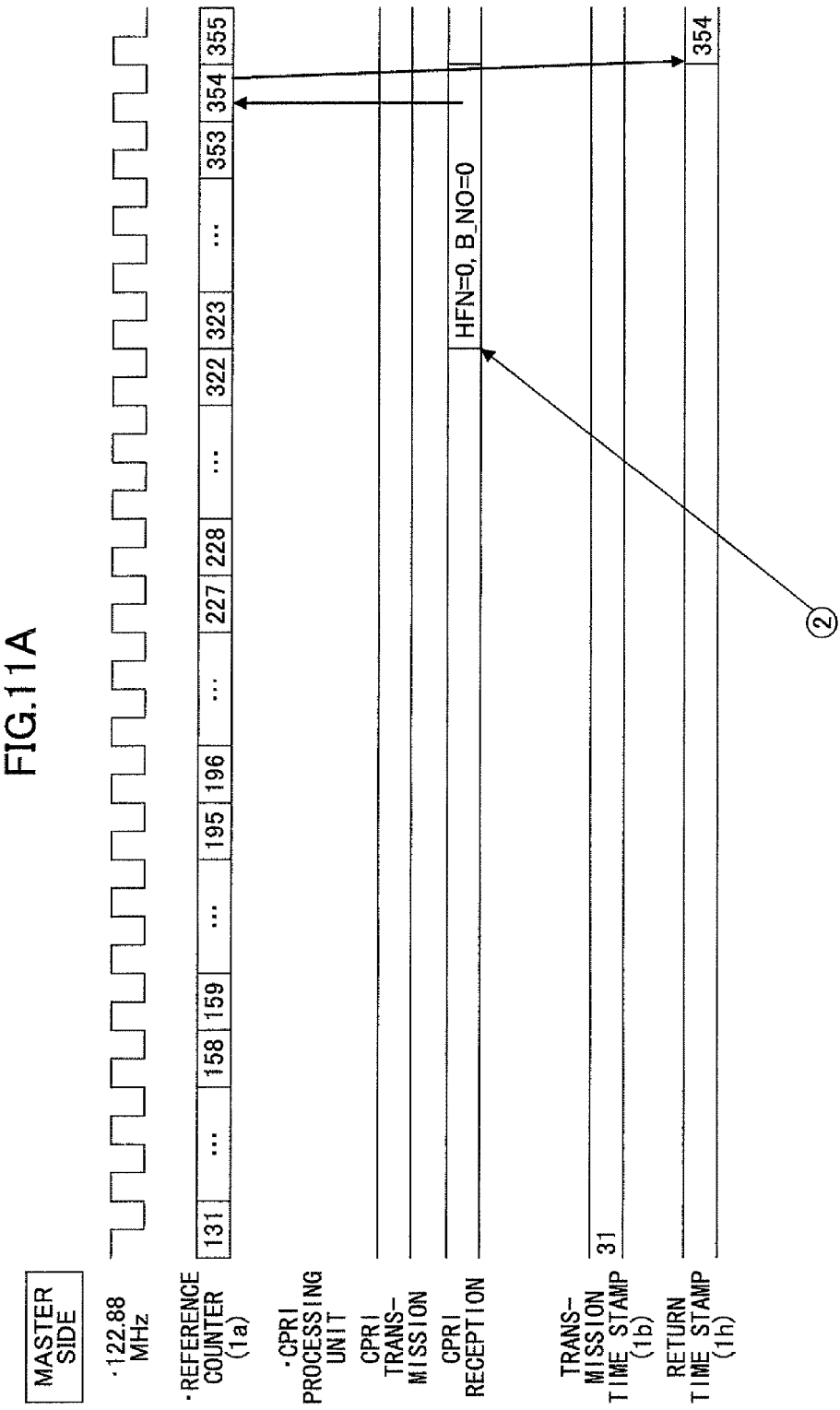

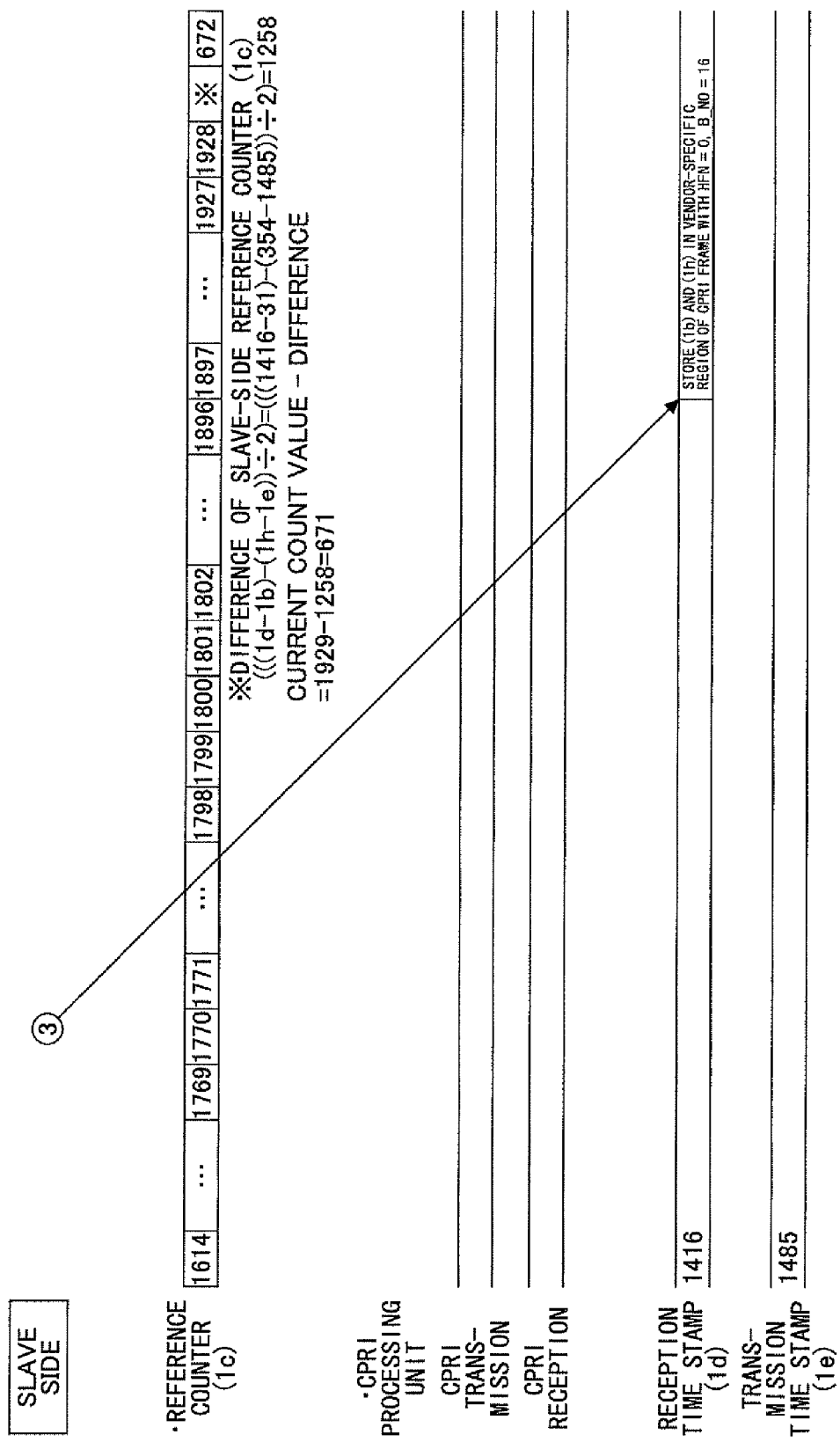

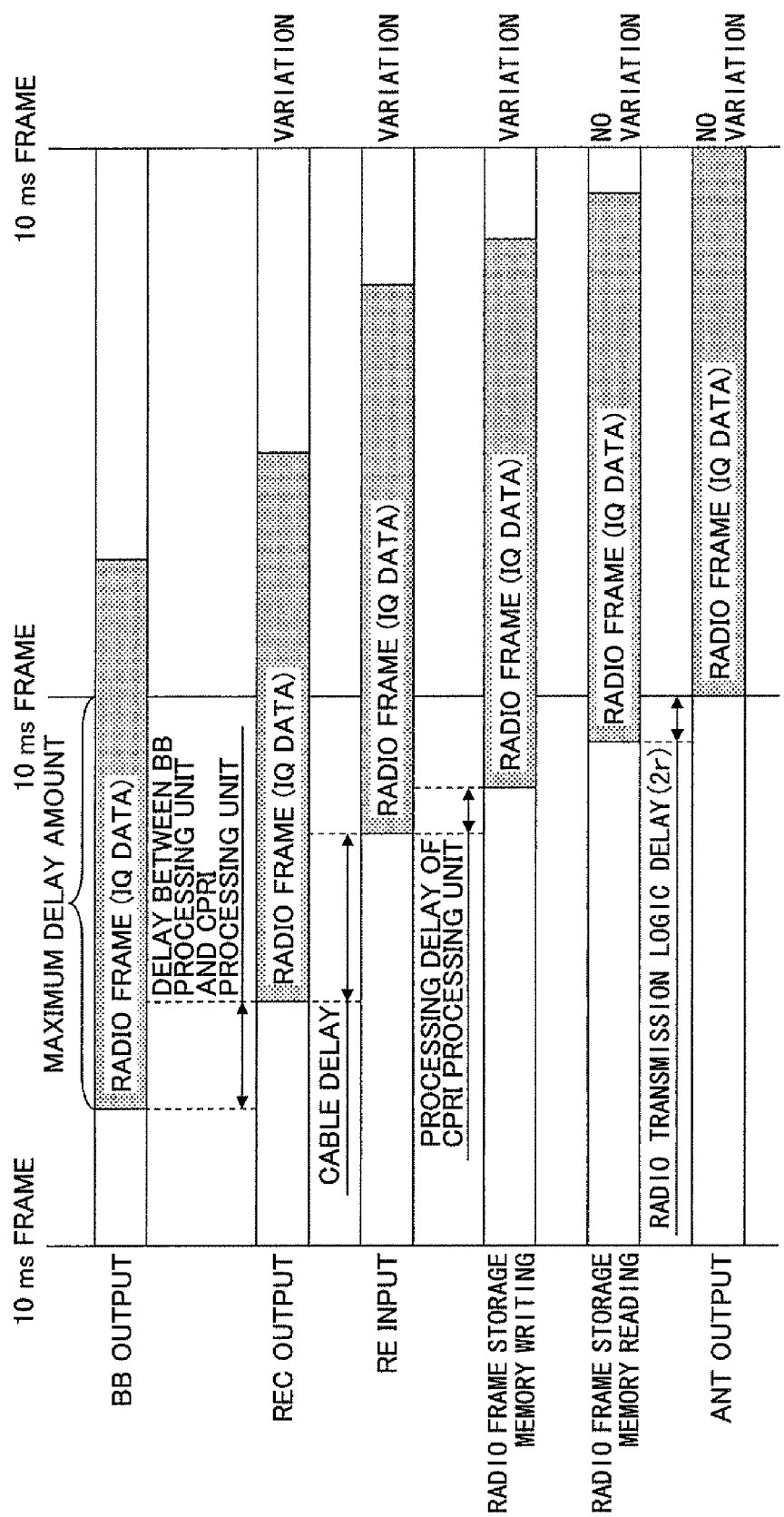

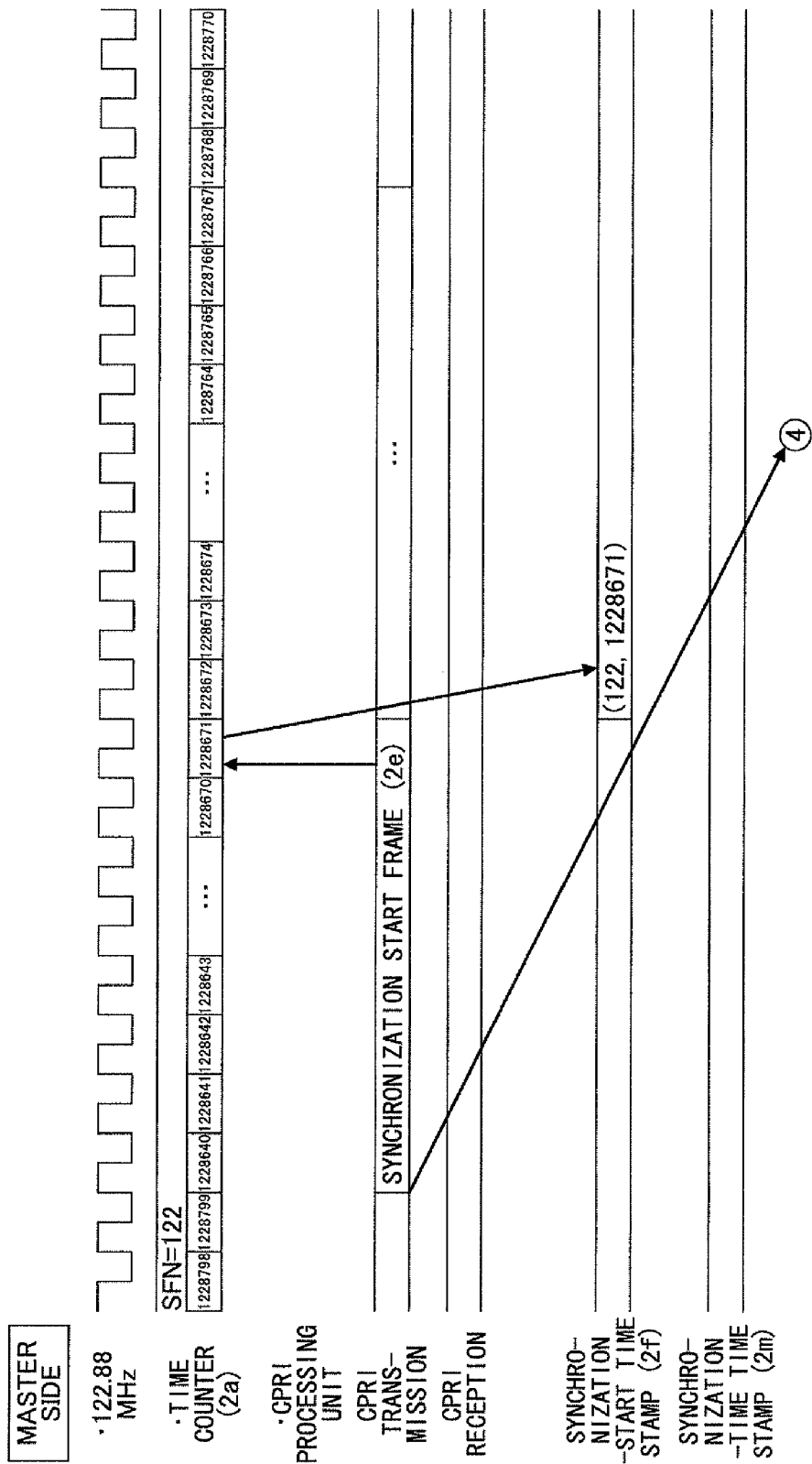

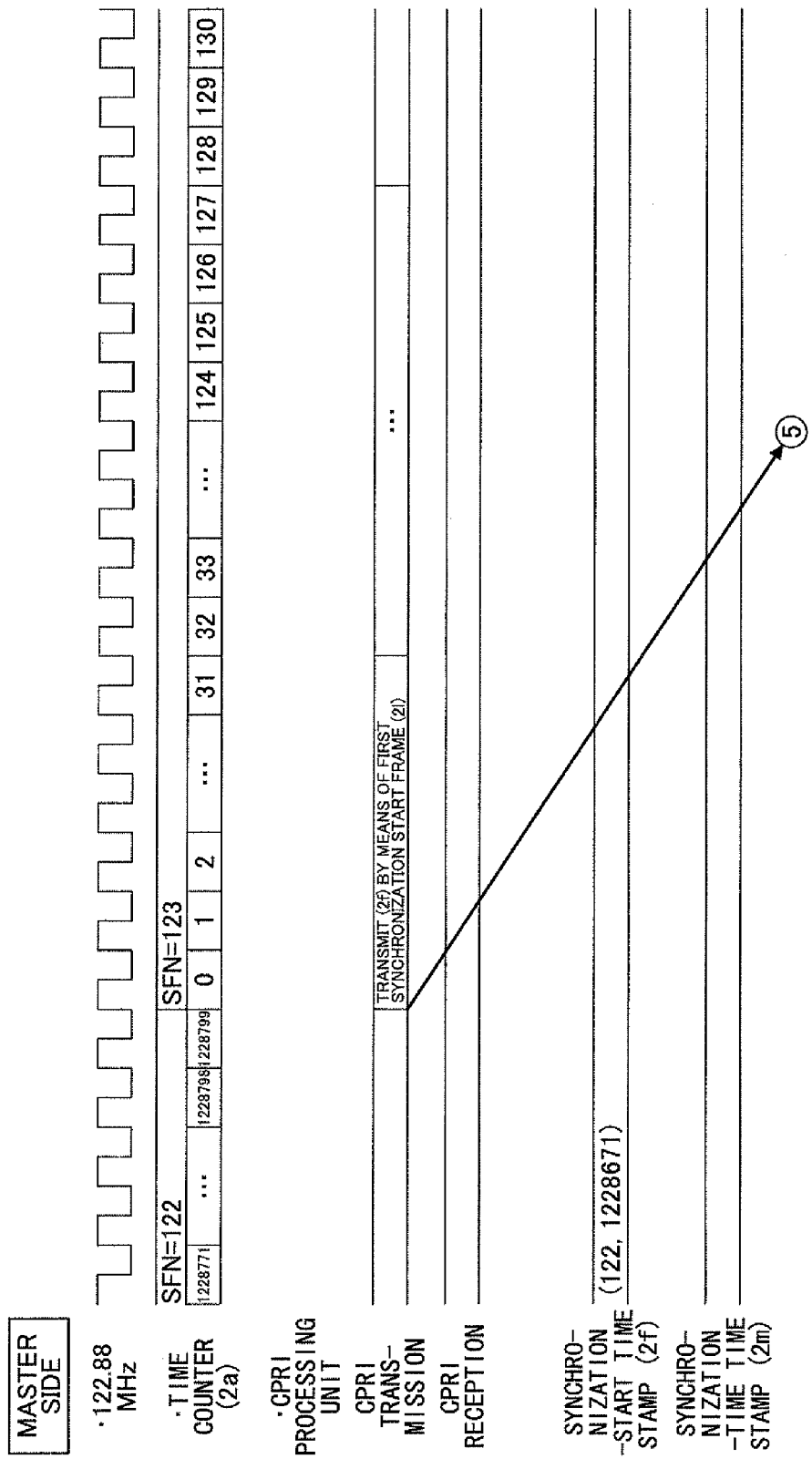

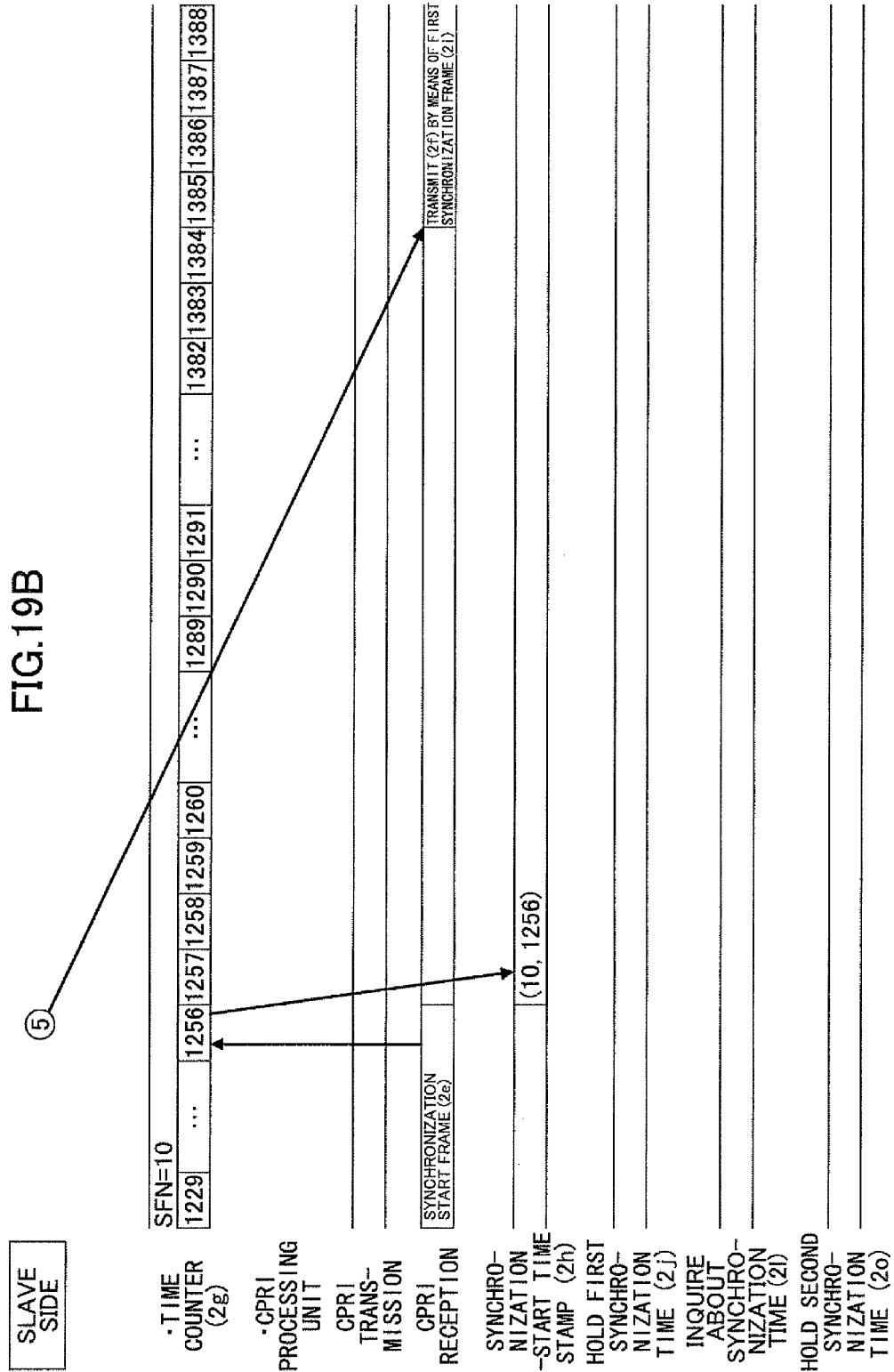

RADIO BASE STATION APPARATUS AND SYNCHRONIZATION METHOD THEREOF

CROSS-REFERENCE TO RELATED APPLICATION

This application is based upon and claims the benefit of priority of the prior Japanese Patent Application No. 2009-071996, filed on Mar. 24, 2009, the entire contents of which are incorporated herein by reference.

FIELD

The embodiment discussed herein is related to a radio base station apparatus and a synchronization method thereof that connect a radio control device and plural radio devices to each other through plural links and transmit and receive data by using a frame.

BACKGROUND

Up until now, there have been discussed an interface, an apparatus, and a method for communication between a radio equipment control (REC) node and first and second radio equipment (RE) nodes in a radio base station that transmits and receives information using plural antenna carriers.

Patent Document 1: Japanese National Publication of International Patent Application No. 2008-516503

Non-Patent Document 1: CPRI Specification v4.0 sec. 6.1 Delay calibration example (Informative)

SUMMARY

According to an aspect of the present invention, there is provided a radio base station apparatus that connects a radio control device and plural radio devices to each other through plural links and transmits and receives data by using a frame. The radio base station apparatus includes a first reference counter that counts a clock pulse of the radio control device or the radio device, each serving as a master; a second reference counter that counts a clock pulse of the radio device serving as a slave; a first-transmission-value holding unit that holds a count value of the first reference counter as a first transmission value when a first specific frame is transmitted from the master to the slave; a first-reception-value holding unit that holds a count value of the second reference counter as a first reception value when the first specific frame is received by the slave; a second-transmission-value holding unit that holds a count value of the second reference counter as a second transmission value when a second specific frame is transmitted from the slave to the master; a second-reception-value holding unit that holds a count value of the first reference counter as a second reception value when the second specific frame is received by the master; a transmission-and-reception-value transmitting unit that transmits the first transmission value and the second reception value from the master to the slave; and a synchronization unit that calculates a difference between the first reference counter and the second reference counter from the first and second transmission values and the first and second reception values and corrects a count value of the second reference counter based on the difference so as to make the count value of the second reference counter coincide with a count value of the first reference counter.

The object and advantages of the present invention will be realized and attained by means of the elements and combinations particularly pointed out in the claims.

It is to be understood that both the foregoing general description and the following detailed description are exemplary and explanatory and are not restrictive of the present invention, as claimed.

BRIEF DESCRIPTION OF DRAWINGS

FIG. 2 is a diagram illustrating definitions on delay measurement;

FIG. 9 is a diagram for explaining delay correction according to the first embodiment;

FIGS. 11A and 11B are signal timing charts according to the first embodiment;

FIGS. 12A and 12B are signal timing charts according to the first embodiment;

FIG. 17 is a diagram for explaining delay correction according to the second embodiment;

FIGS. 18A and 18B are signal timing charts according to the second embodiment;

FIGS. 19A and 19B are signal timing charts according to the second embodiment;

DESCRIPTION OF EMBODIMENTS

In recent mobile telephone services, there are increasing tendencies to perform broadcast services such as MBMS (Multimedia Broadcast and Multicast Service) using UE (User Equipment). In order to perform broadcast services using user equipment, the function of transmitting the same data with handover even if the user equipment moves to the area of other radio equipment (RE) (acting as radio devices, and so forth) is requested. To this end, it is required to transmit the same data at the antenna positions of plural pieces of radio equipment having different cable lengths connected to radio equipment control (REC) (acting as a radio control device, and so forth).

As an interface between the radio equipment control and the plural pieces of radio equipment, a CPRI (Common Public Radio Interface), for example, is used. When the radio equipment control and the plural pieces of radio equipment are connected to each other by optical cables using the CPRI, transmission delay times between the radio equipment control and the plural pieces of radio equipment are different depending on the lengths of the optical cables. On the other hand, as a radio system, delay times due to a difference in the lengths of the optical cables are corrected so as to synchronize the output timings of the radio equipment with each other. A method for measuring a delay time is described in Non-Patent Document 1. According to the CPRI specification described in Non-Patent Document 1, a delay time is adjusted on the side of a radio equipment control.

Figure 1A:
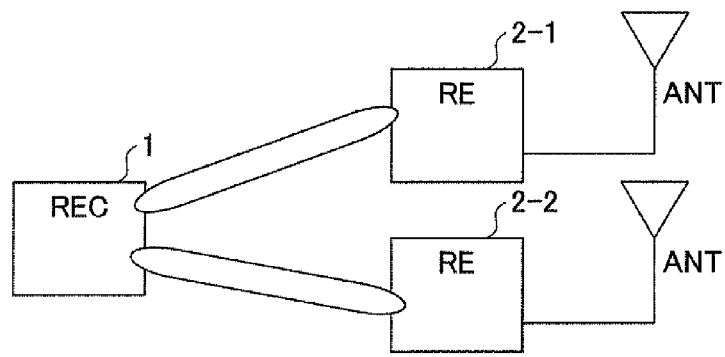
FIGS. 1A and 1B are diagrams illustrating configuration examples of a radio base station apparatus.
Figure 1B:
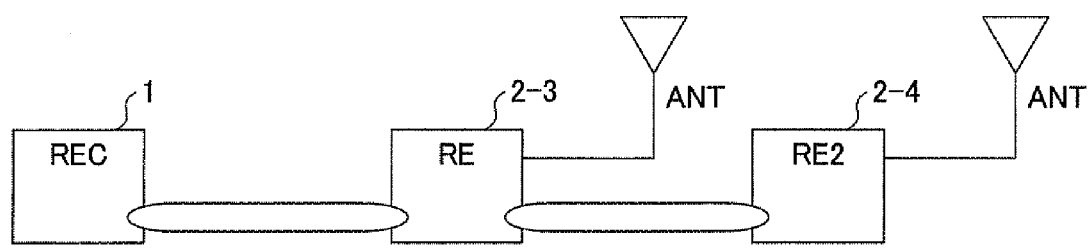

FIGS. 1A and 1B illustrate the configuration examples of a radio base station apparatus. In FIG. 1A, plural pieces of radio equipment 2-1 and 2-2 are star-connected to a radio equipment control 1, thereby configuring the radio base station apparatus. In FIG. 1B, radio equipment 2-3 is connected to the radio equipment control 1. Also, radio equipment 2-4 is cascade-connected to the radio equipment 2-3, thereby configuring the radio base station apparatus.

FIG. 2 illustrates the definition of points on delay measurement. As the points for implementing the delay measurement, R1, R2, R3, R4, Tx, and Rx are defined. Here, the point R1 is the output terminal of the radio equipment control 1, and the point R4 is the input terminal of the radio equipment control 1. The point R2 is an input terminal on the side of the CPRI interface of the radio equipment 2, and the point R3 is an output terminal on the side of the CPRI interface of the radio equipment 2. Furthermore, the points Tx and Rx are the input and output terminals of an antenna.

Furthermore, T14, T12, Toffset, T34, X, and Y are defined as delay times between the respective points. Here, the delay time T14 is a time difference between the output timing of a CPRI frame from the output terminal R1 of the radio equipment control 1 and the input timing of the CPRI frame to the input terminal R4 of the radio equipment control 1. The delay time T12 is a delay time between the output terminal R1 of the radio equipment control 1 and the input terminal R2 of the radio equipment 2. The delay time Toffset is a delay time until the input timing of the CPRI frame from the input terminal R3 of the radio equipment 2 is output to the output terminal T4 of the radio equipment control 1.

The delay time T34 is a delay time between the output terminal R3 of the radio equipment 2 and the input terminal R4 of the radio equipment control 1. Furthermore, a down inter-equipment delay X is a delay time until a baseband signal input to the input terminal R2 of the radio equipment 2 is output from an antenna terminal, and an up inter-equipment delay Y is a delay time until the input of the antenna terminal is output to the output terminal R3 of the radio equipment 2.

Here, the delay time T14 until the CPRI frame output from the radio equipment control 1 is returned from the radio equipment 2 is measured. The cable delay times T12 and T34 are the values obtained by dividing into halves results where the return time Toffset on the side of the radio equipment 2 is subtracted from the delay time T14. When the radio equipment control 1 operates at a frequency of 122.88 MHz, the delay time T14 itself can be measured by Tc/32 (where 1 chip of Tc=260.42 nsec=1/3.84 MHz), but the value of the delay time Toffset includes an error.

Figure 3:
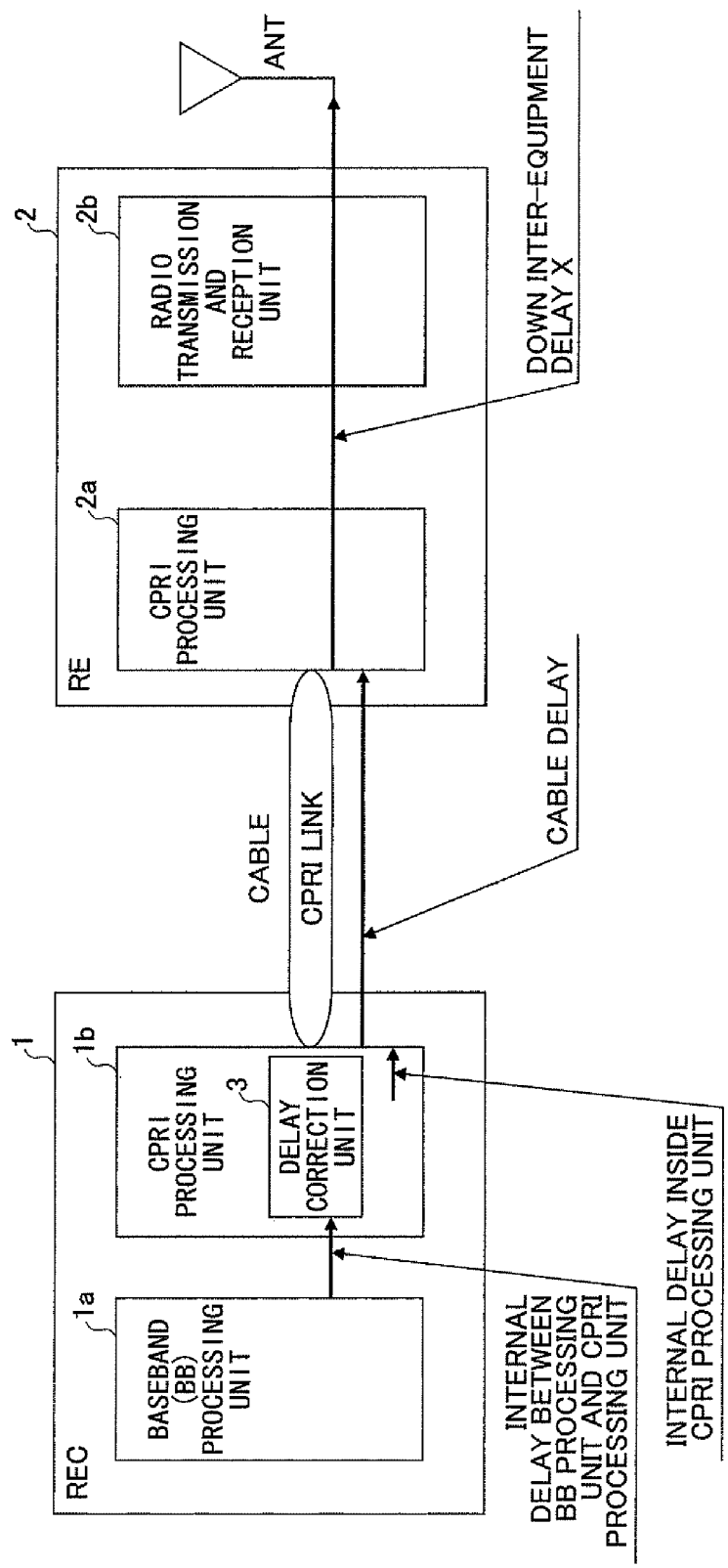
FIG. 3 is a diagram illustrating definitions on delay measurement.

As illustrated in FIG. 3, inside the radio equipment control 1, an internal delay between a BB (Baseband) processing unit 1a and a CPRI processing unit 1b and an internal delay inside the CPRI processing unit 1b due to a delay correction unit 3 are caused. Between the radio equipment control 1 and the radio equipment 2, a cable delay due to a cable (CPRI LINK) is caused. Furthermore, inside the radio equipment 2, the down inter-equipment delay X is caused between a CPRI processing unit 2b and a radio transmission and reception unit 2b.

Figure 4:
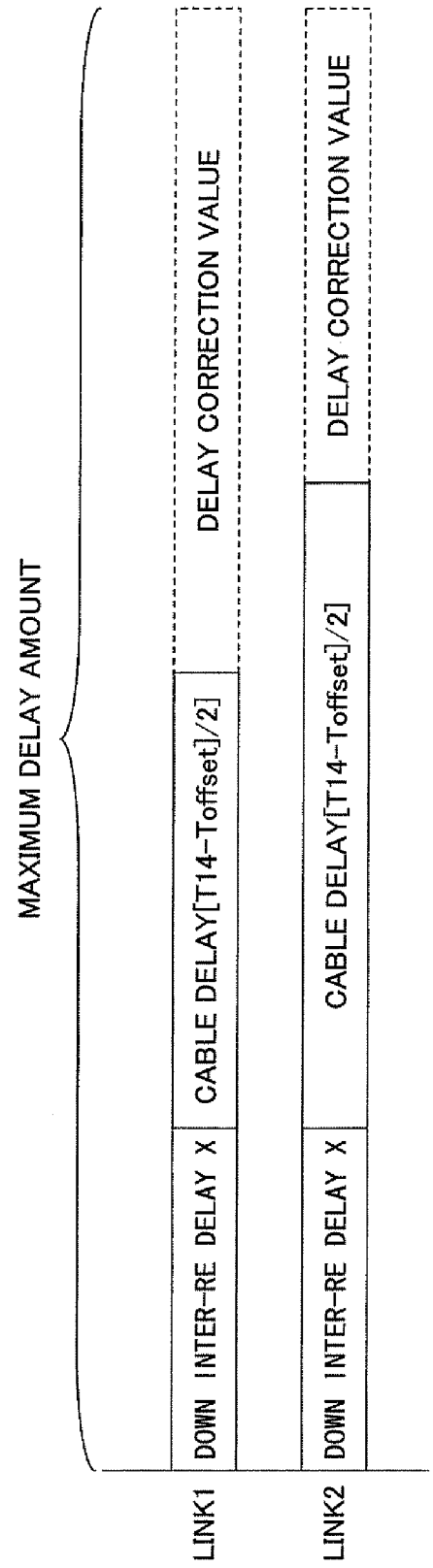
FIG. 4 is a diagram for explaining general delay correction.

As illustrated in FIG. 4, when a delay is corrected in the radio equipment control 1, a value, which is obtained by subtracting a calculated cable delay time $\{(T14-Toffset)/2\}$ and the down inter-equipment delay X on the side of the radio equipment 2 from a value specified as a maximum delay amount between the radio equipment control 1 and the antenna terminal Tx, is regarded as a delay correction value by the delay correction unit 3.

Then, the transmission of IQ data is delayed by the calculated delay correction value so as to correct time from the radio equipment control 1 to the antenna position of the radio equipment 2 into a maximum delay amount at links 1 and 2 (radio equipment 2-1 and 2-2). Thus, the IQ data are caused to be output earlier by the maximum delay amount from the baseband processing unit 1a of the radio equipment control 1, whereby the heads of the IQ data are synchronized with each other at the position of the antenna of the radio equipment 2.

Since the CPRI frame has a basic frame (1 chip=260.42 nsec=1/3.84 MHz) as a minimum unit, it cannot correct time so as to be shorter than a basic frame time (1 chip=260.42 nsec). Therefore, an error of ±1 chip≈±260 nsec is caused. If the radio equipment 2 is cascade-connected, an error of ±1 chip is further added.

Note that there have been proposed a variety of delay correction methods between a radio equipment control and radio equipment using a CPRI interface (see, for example, Patent Document 1).

The internal delay between the baseband processing unit 1a and the CPRI processing unit 1b and the internal delay inside the CPRI processing unit 1b as illustrated in FIG. 3 are hard logic processing. Therefore, these delays are fixed. Since the fixed delay is corrected by the delay correction unit 3 of the CPRI processing unit 1b on the side of the radio equipment control 1, an error is eliminated.

Generally, the CPRI connects the radio equipment control 1 and the radio equipment 2 to each other with fiber optics. The fiber optics also has a delay variation (31 psec/° C./km) due to temperature. In this case, a variation of 12.4 nsec is caused provided that a distance is 20 km and a temperature change is 20° C. Due to this variation, a measurement value for the delay time T14 and a delay correction value are changed, which results in the occurrence of the data slip of IQ data.

Since the cable delay includes a measurement error, an optical cable delay change, and a reception error of SERDES (SERializer/DESerializer), a variation occurs. Furthermore, since a delay is corrected in units of 1 chip (260 nsec), a variation occurs. Furthermore, since the down inter-equipment delay also includes SERDES, a variation occurs. As a result, a variation of about ±1 chip occurs at antenna output.

Generally, a 10 msec radio frame is output earlier by a maximum delay up to an antenna (ANT) from the baseband processing unit 1a so that a delay correction amount (obtained by subtracting a cable delay and a down inter-equipment delay X from a maximum delay) is delayed at the delay correction unit 3 of the CPRI processing unit 1b on the side of the radio equipment control 1. With this configuration, the 10 msec radio frame is synchronized at the antenna.

Figure 5:
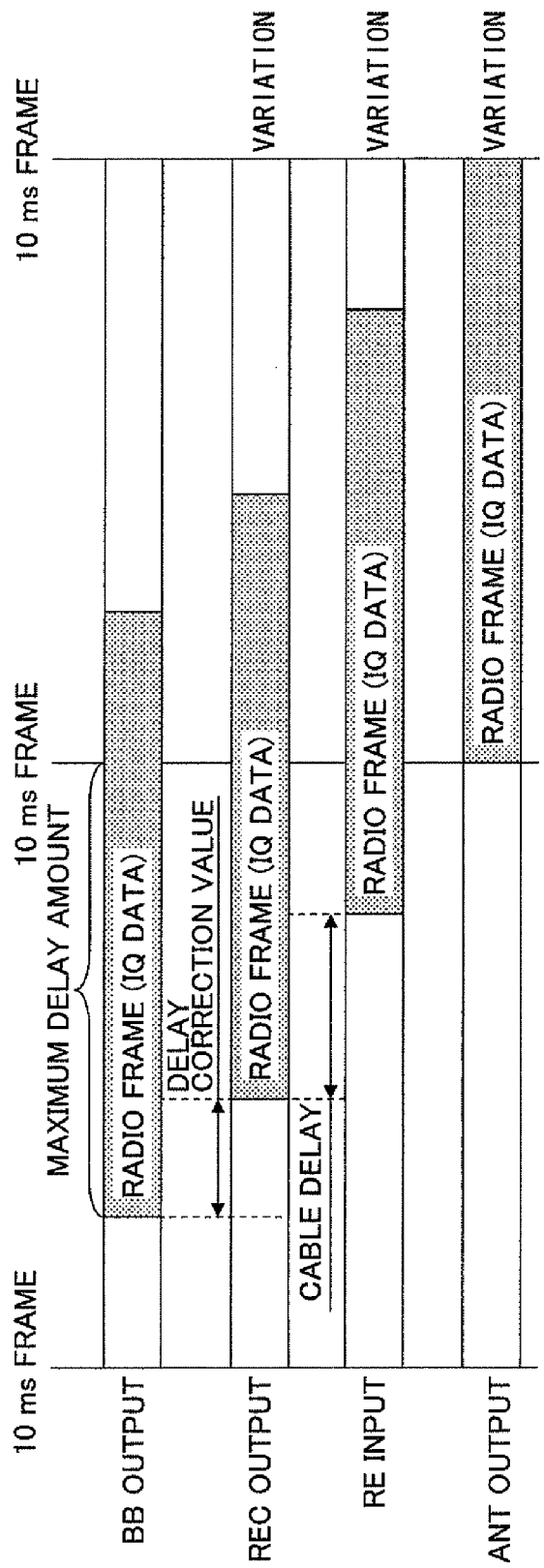
FIG. 5 is a diagram for explaining the general delay correction.

The 10 msec radio frame illustrated in FIG. 5 represents time in the radio equipment control 1, and the radio equipment 2 recognizes only the 10 msec radio frame delayed by a transmission time. Therefore, transmission timing cannot be set in the radio equipment 2. As described above, errors (±1 chip) of Toffset and CPRI basic frame occur. Accordingly, it is required that all the phases, times, frequencies be synchronized with each other in a MBSFN (MBMS Single Frequency Network) and 4×4 MIMO (Multiple Input Multiple Output). When a delay is corrected only with the radio equipment control, the radio frames may not be synchronized with each other at the antenna terminal of the radio equipment due to a delay error up to the antenna terminal.

Next, referring to the accompanying drawings, a description is made of embodiments of the present invention.

(First Embodiment)

Figure 6:
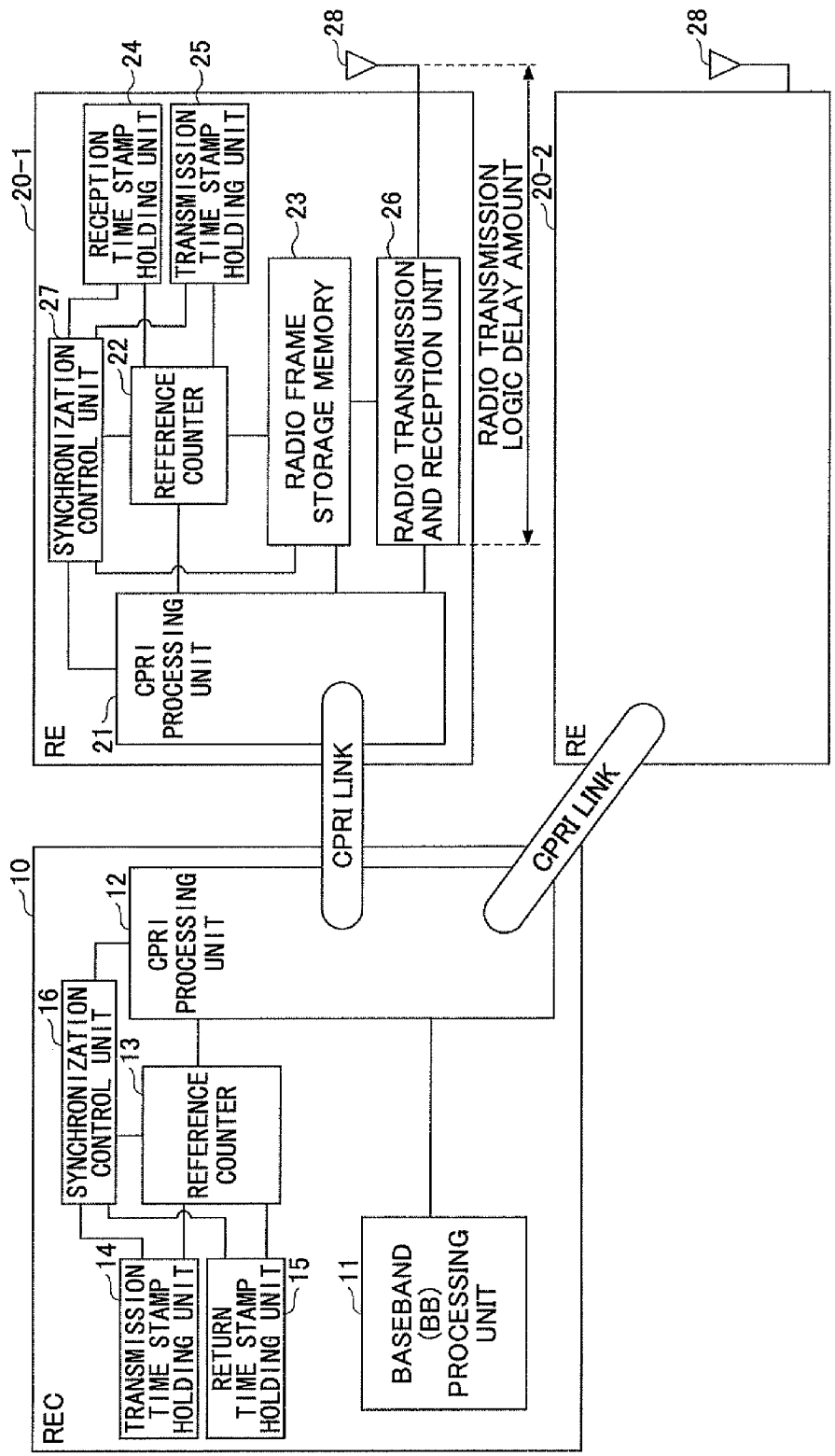
FIG. 6 is the configuration diagram of a first embodiment of the radio base station apparatus.

FIG. 6 illustrates the configuration diagram of a first embodiment of a radio base station apparatus. In this embodiment, a CPRI frame is used as a data frame. Plural pieces of radio equipment (RE) 20-1 and 20-2 are star-connected to radio equipment control (REC) 10, thereby configuring the radio base station apparatus.

A baseband (BB) processing unit 11 of the radio equipment control 10 serving as a master generates a radio frame and notifies a CPRI processing unit 12 of the head of the radio frame.

A reference counter 13 generates a reference count value synchronized with a SFN (System Frame Number) by counting a clock pulse.

A transmission time stamp holding unit 14 holds a reference count value when the CPRI frame with a hyper frame number (HFN) value of 0 and a basic frame number (B_NO) value of 0 is transmitted.

A return time stamp holding unit 15 holds a master-side reference count value when the CPRI frame with a hyper frame number (HFN) value of 0 and a basic frame number (B_NO) value of 0 is received.

The CPRI processing unit 12 transmits and receives the CPRI frame and notifies a synchronization control unit 16 of the fact. Furthermore, the CPRI processing unit 12 stores the head position of the radio frame received from the baseband processing unit 11 in a vendor-specific region and transmits the same to the radio equipment 20-1.

The synchronization control unit 16 instructs the transmission time stamp holding unit 14 and the return time stamp holding unit 15 to hold their time stamp values. Furthermore, the synchronization control unit 16 instructs the CPRI processing unit 12 to store the time stamp values held in the transmission time stamp holding unit 14 and the return time stamp holding unit 15 in the vendor-specific region of the CPRI frame and transmit the same to the radio equipment 20-1.

Figure 7:
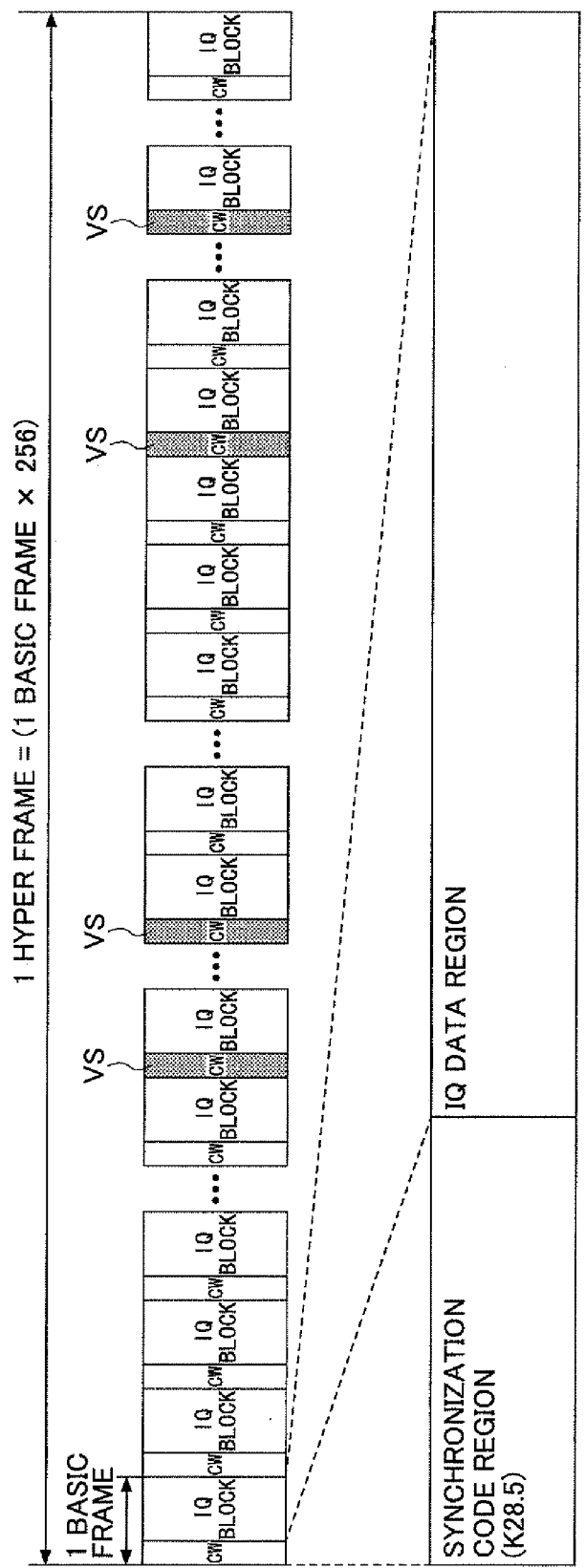
FIG. 7 is a diagram illustrating the format of a CPRI.

FIG. 7 illustrates the frame format of the CPRI. In FIG. 7, one hyper frame has, for example, 256 basic frames. The frame length of one basic frame is one chip (=260.42 nsec=1/3.84 MHz) and has a control word (CW) region for transmitting and receiving control data and an IQ data region (IQ data block) for transmitting and receiving a baseband signal.

Furthermore, the control word periodically transmits a synchronization byte. The control word of the head basic frame of the hyper frame transmits a synchronization code (K28.5), indicating the head of the hyper frame. Furthermore, a prescribed order of the control word of the hyper frame is the vendor-specific region (represented as VS in FIG. 7) that users can freely use.

In FIG. 6, a CPRI processing unit 21 of the radio equipment 20-1 serving as a slave transmits and receives the CPRI frame and notifies a synchronization control unit 27 of the fact. The CPRI processing unit 21 notifies a reference counter 22 of the time stamp value stored in the vendor-specific region of the received CPRI frame. Furthermore, the CPRI processing unit 21 writes IQ data in a radio frame storage memory 23 from the head of the radio frame stored in the vendor-specific region.

The reference counter 22 generates a reference count value in a self-running manner by counting a clock pulse at non-synchronization time. Furthermore, the reference count value of the reference counter 22 is corrected by the synchronization control unit 27.

A reception time stamp holding unit 24 stores the reference count value of the reference counter 22 when the CPRI frame with a HFN value of 0 and a B_NO value of 0 is received.

A transmission time stamp holding unit 25 stores the reference value of the reference counter 22 when the slave transmits the CPRI frame with a HFN value of 0 and a B_NO value of 0 to the master.

A radio frame storage memory 23 stores the radio frame data extracted by the CPRI processing unit 21 and reads the same when being requested by a radio transmission and reception unit 26.

A synchronization control unit 27 instructs the reception time stamp holding unit 24 and the transmission time stamp holding unit 25 to hold their time stamp values. Furthermore, the synchronization control unit 27 calculates a difference between a count value of the reference counter 22 and that of the reference counter 13 from the time stamp value notified from the CPRI processing unit 21 and the time stamp values stored in the reception time stamp holding unit 24 and the transmission time stamp holding unit 25, and corrects the reference counter 22 based on the difference.

Meanwhile, a radio transmission logic delay amount is determined according to a logic delay and a cable delay from the radio transmission and reception unit 26 to an antenna 28. The radio transmission and reception unit 26 reads from the radio frame storage memory 23 the radio frame data earlier by the radio transmission logic delay amount than a timing for starting the transmission of the radio frame data to the antenna 28 and supplies the same to the antenna 28. Note that the radio equipment 20-2 has the same configuration as that of the radio equipment 20-1.

(Operations Sequence According To First Embodiment)

Figure 8:
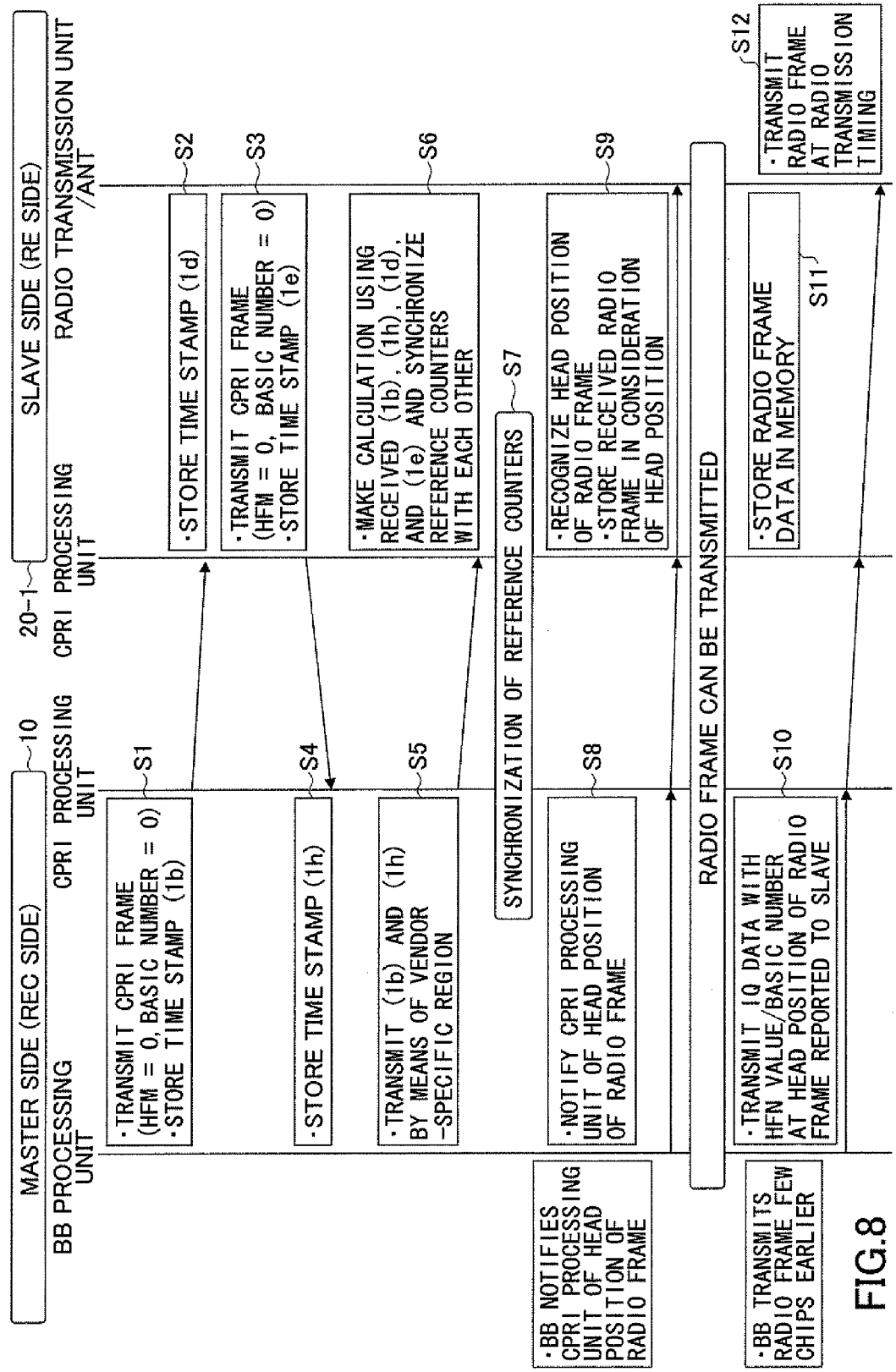
FIG. 8 is an operations sequence diagram according to the first embodiment.

FIG. 8 illustrates an operations sequence according to the first embodiment. In FIG. 8, the radio equipment control 10 stores the time stamp value of the reference counter 13 in the transmission time stamp holding unit 14 as a transmission time stamp value ($1b$) at the time of transmitting the CPRI frame with a hyper frame number (HFN) value of 0 and a basic frame number (B_NO) value of 0, i.e., the head basic frame of the hyper frame (Si).

The radio equipment 20-1 stores the count value of the self-running reference counter 22 at the time of receiving the CPRI frame with a HFN value of 0 and a B_NO value of 0 in the reception time stamp holding unit 24 as a reception time stamp value ($1b$) (S2). Then, the radio equipment 20-1 stores the time stamp value of the reference counter 22 in the transmission time stamp holding unit 25 as a transmission time stamp value ($1e$) at the time of transmitting the CPRI frame with a HFN value of 0 and a B_NO value of 0 to the radio equipment control 10 (S3).

The radio equipment control 10 holds the count value of the reference counter 13 at the time of receiving the CPRI frame with a HFN value of 0 and a B_NO value of 0 in the return time stamp holding unit 15 as a return time stamp value ($1h$)

(S4). Then, the synchronization control unit 16 of the radio equipment control 10 causes the CPRI processing unit 12 to store the transmission time stamp value (1b) of the transmission time stamp holding unit 14 and the return time stamp value (1h) of the return time stamp holding unit 15 in the vendor-specific region and transmit the same to the radio equipment 20-1 (S5).

The CPRI processing unit 21 of the radio equipment 20-1 receives the transmission time stamp value (1b) and the return time stamp value (1h) from the radio equipment control 10. The synchronization control unit 27 calculates a difference between a count value of the reference counter 13 and that of the reference counter 22 and a cable delay by using the reception time stamp value (1d) of the reception time stamp holding unit 24 and the transmission time stamp value (1e) of the transmission time stamp holding unit 25. Note that the calculation of the cable delay is not necessarily required.

Difference={ (1d−1b)−(1h−1e)}/2

Cable delay={(1d−1b)+(1h−1e)}/2

The synchronization control unit 27 sets a calculated difference to the reference counter 22, thereby matching and synchronizing the count value of the reference counter 22 and that of the reference counter 13 with each other (S6 and S7).

In order to make the head of the radio frame align at the position of the antenna 28, the radio equipment 20-1 needs to know which position of the CPRI frame the head of the radio frame is stored. Therefore, the baseband processing unit 11 notifies the CPRI processing unit 12 of the head position of the radio frame. By using the vendor-specific region, the CPRI processing unit 12 transmits the HFN value and the N_NO value of the CPRI frame, which store the IQ data of the head of the radio frame, i.e., the head position of the radio frame, to the radio equipment 20-1 (S8).

The CPRI processing unit 21 of the radio equipment 20-1 extracts the HFN value and the N_NO value of the CPRI frame which store the IQ data of the head of the radio frame and notifies the synchronization control unit 27 of the same. Thus, the synchronization control unit 27 can sequentially write the IQ data of the head of the radio frame in the radio frame storage memory 23 so as to be positioned at the initial address (0) of the radio frame storage memory 23 (S9).

The radio equipment control 10 transmits the IQ data to the radio equipment 20-1 in such a manner as to be preceded by a few chips in addition to a maximum delay up to the antenna 28 so that the radio equipment 20-1 is capable of compensating for a variation. At this time, the HFN value and the N_NO value of the CPRI frame which store the IQ data of the head of the radio frame are referred to those transmitted in step S8 (S10).

The radio equipment 20-1 temporarily stores the IQ data of the received CPRI frame in the radio frame storage memory 23. At this time, the IQ data (the HFN value and the N_NO value have been already reported to the synchronization control unit 27) of the head of the radio frame are stored in the head address (0) of the radio frame storage memory 23 (S11).

The radio transmission and reception unit 26 sequentially reads the IQ data from the initial address of the radio frame storage memory 23 and generates the radio frame so as to be synchronized with a radio-frame transmission cycle every 10 msec (generated based on the reference counter 23). Then, the radio transmission and reception unit 26 transmits the radio frame from the radio equipment (S12).

As described above, the reference count values of all the radio equipment 20-1 and 20-2, which are star-connected to the radio equipment control 10, are synchronized with the reference count value of the radio equipment control 10, thereby making it possible to synchronize the transmission timings at the antenna positions of all the radio equipment 20-1 and 20-2 with each other. Thus, since a delay amount is conventionally corrected on the side of the radio equipment control 1, the radio frame has a large time variation at an antenna output as illustrated in FIG. 5. However, according to this embodiment, as illustrated in FIG. 9, the radio frame can have less time variation at an antenna output.

In this embodiment, the transmission time stamp holding unit 14 is used as an example of a first-transmission-value holding unit; the reception time stamp holding unit 24 is used as an example of a first-reception-value holding unit; the transmission time stamp holding unit 25 is used as an example of a second-transmission-value holding unit; the return time stamp holding unit 15 is used as an example of a second-reception-value holding unit; the CPRI processing unit 12 is used as an example of a transmission-and-reception-value transmitting unit; the synchronization control unit 27 is used as an example of a synchronization unit; and the CPRI processing unit 12 is used as an example of a head-position transmitting unit.

(Signal Timing Chart According To First Embodiment)

FIGS. 10 through 13 illustrate signal timing charts according to the first embodiment. Here, a time stamp is acquired at the position of the last data of each basic frame.

Figure 10A:
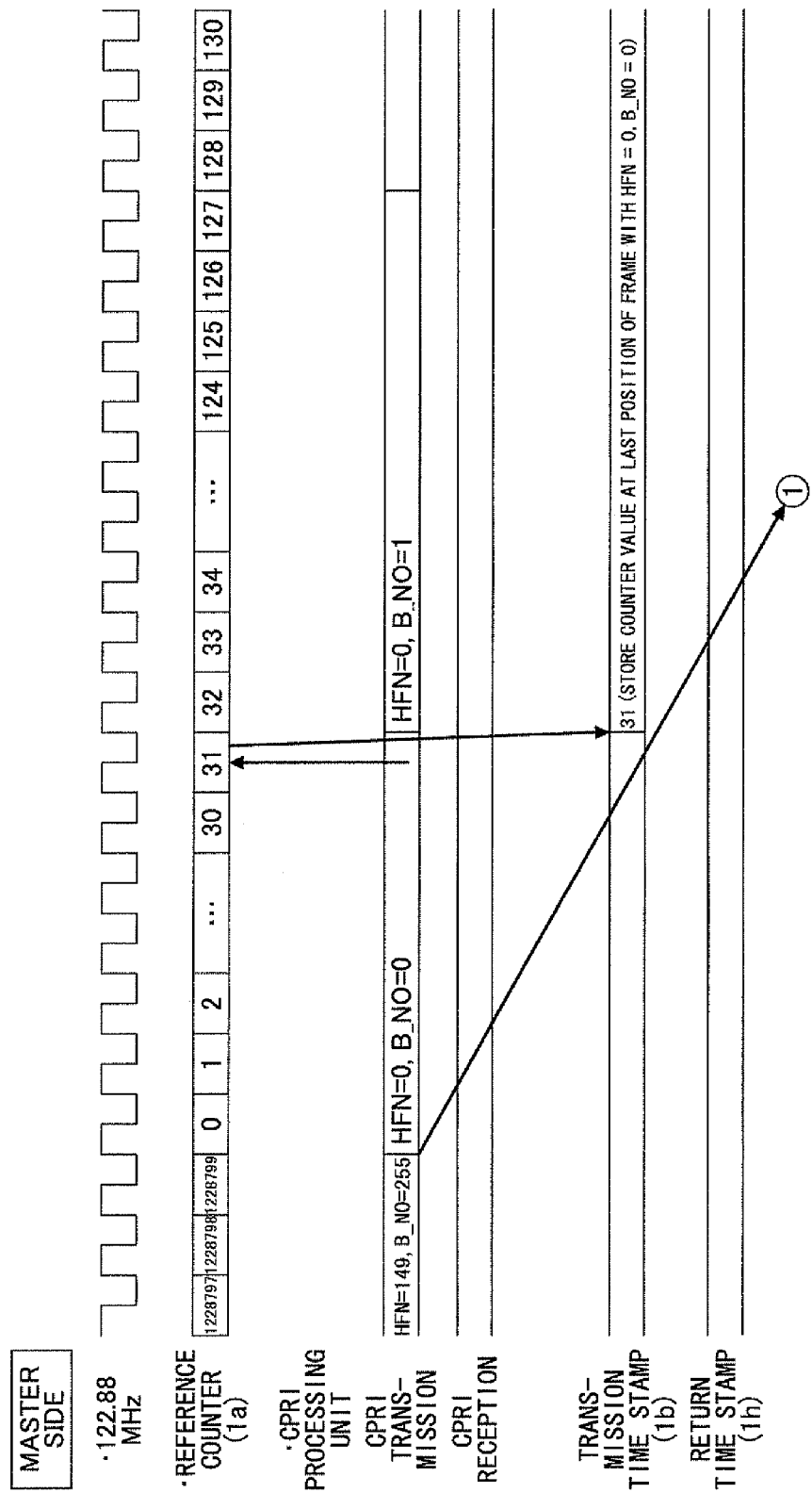
FIGS. 10A and 10B are signal timing charts according to the first embodiment.
Figure 10B:
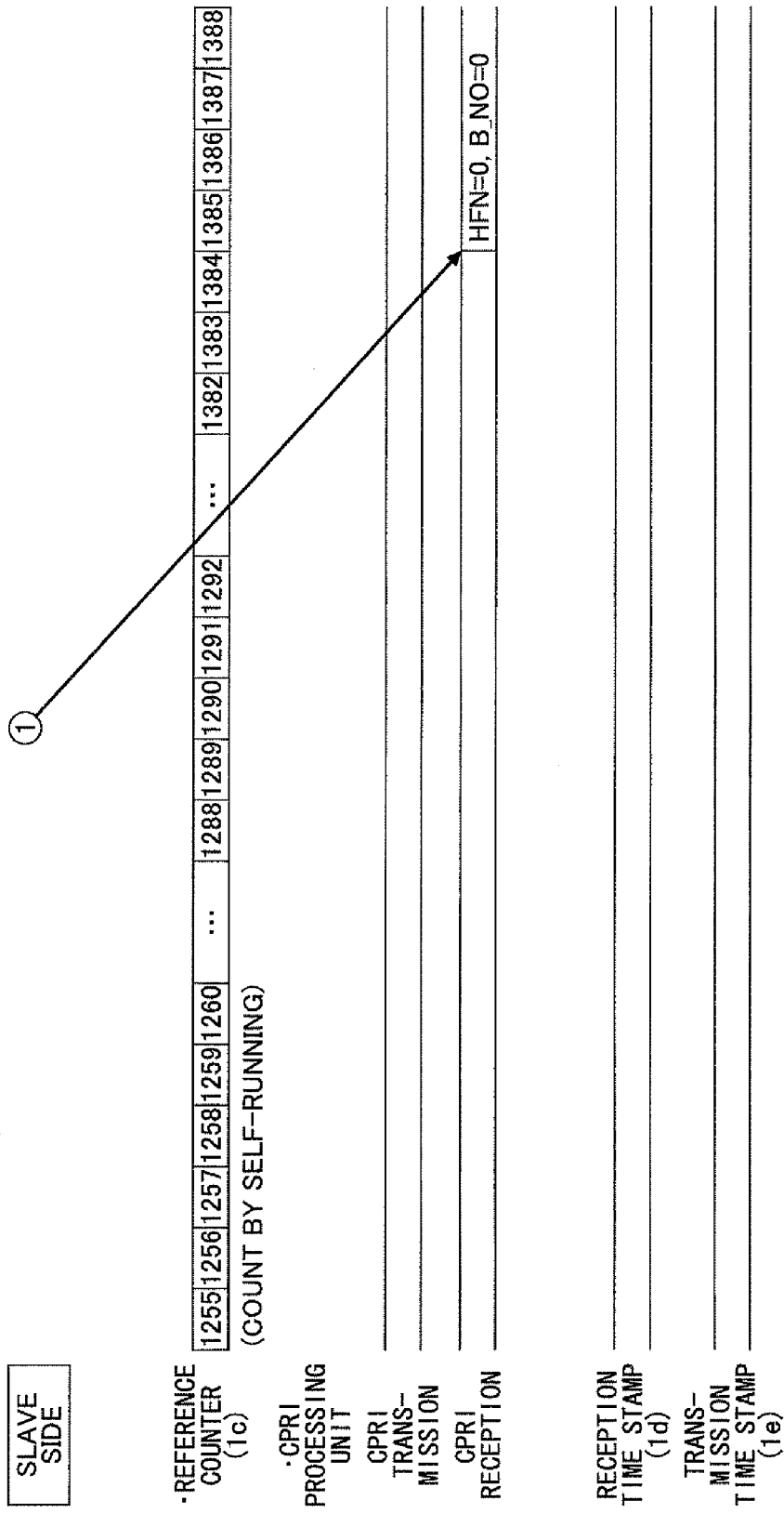

As illustrated in FIGS. 10A and 10B, the CPRI frame with a HFN of 0 and a B_NO of 0 is first transmitted from the CPRI processing unit 12 of the radio equipment control 10 serving as a master when the count value of the reference counter 13 is 0. The count value "31" when the last data of the CPRI frame with a HFN of 0 and a B_NO of 0 are transmitted is stored in the transmission time stamp holding unit 14 as the transmission time stamp (1b).

Figure 11B:
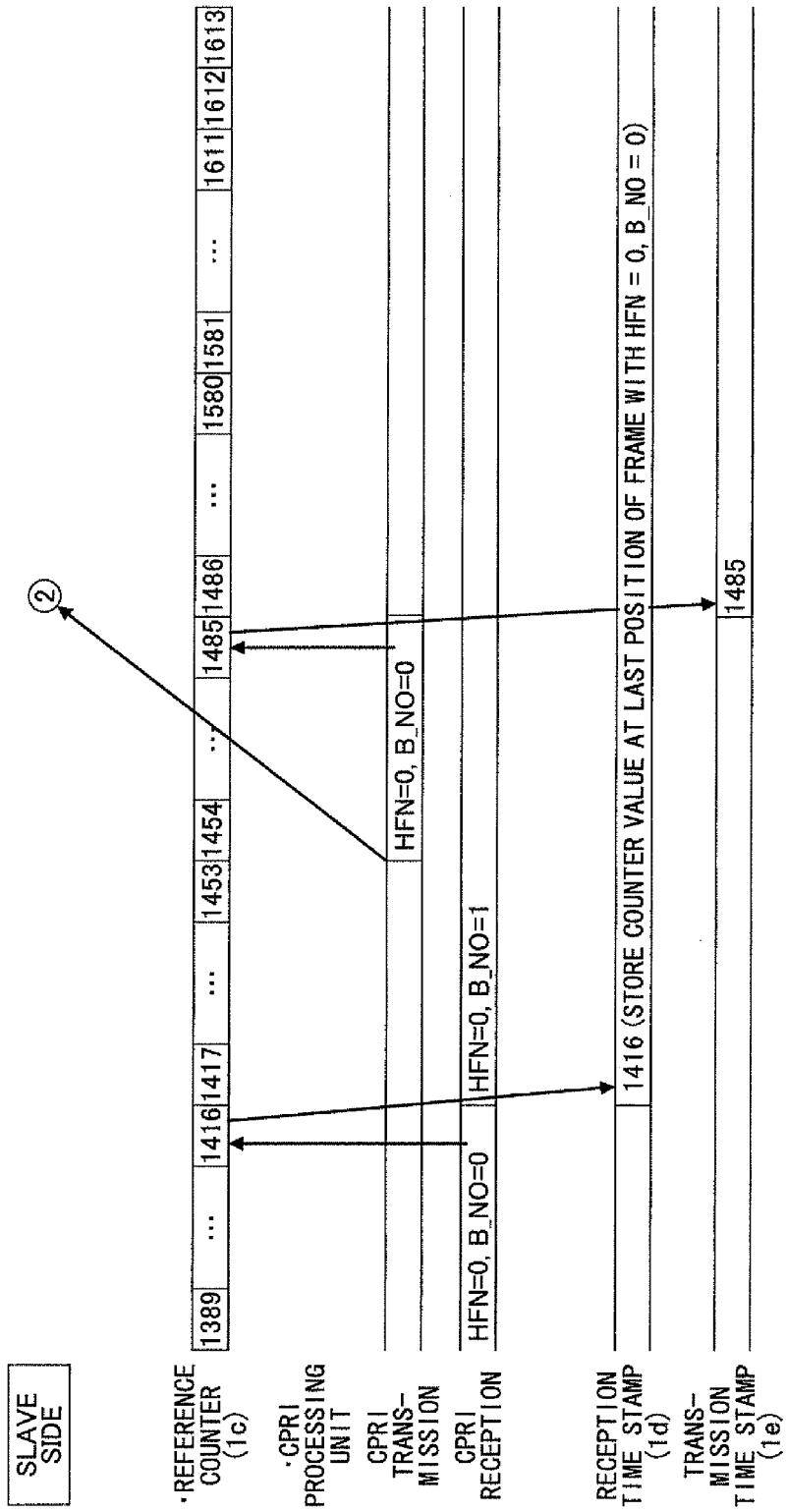

As illustrated in FIGS. 11A and 11B, the radio equipment 20-1 serving as a slave stores the count value "1416" of the self-running reference counter 22 in the reception time stamp holding unit 24 as the reception time stamp (1d) at the time of receiving the last data of the CPRI frame with a HFN of 0 and a B_NO of 0.

Then, the radio equipment 20-1 transmits the CPRI frame with a HFN of 0 and a B_NO of 0 from the CPRI processing unit 21 to the radio equipment control 10. The radio equipment 20-1 stores the count value "1485" of the reference counter 22 at the time of transmitting the last data of the CPRI frame with a HFN of 0 and a B_NO of 0 in the transmission time stamp holding unit 25 as the transmission time stamp (1e).

The radio equipment control 10 stores the count value "354" of the reference counter 13 at the time of receiving the last data of the CPRI frame with a HFN of 0 and a B_NO of 0 from the radio equipment 20-1 in the return time stamp holding unit 15 as the return time stamp (1h).

Figure 12A:
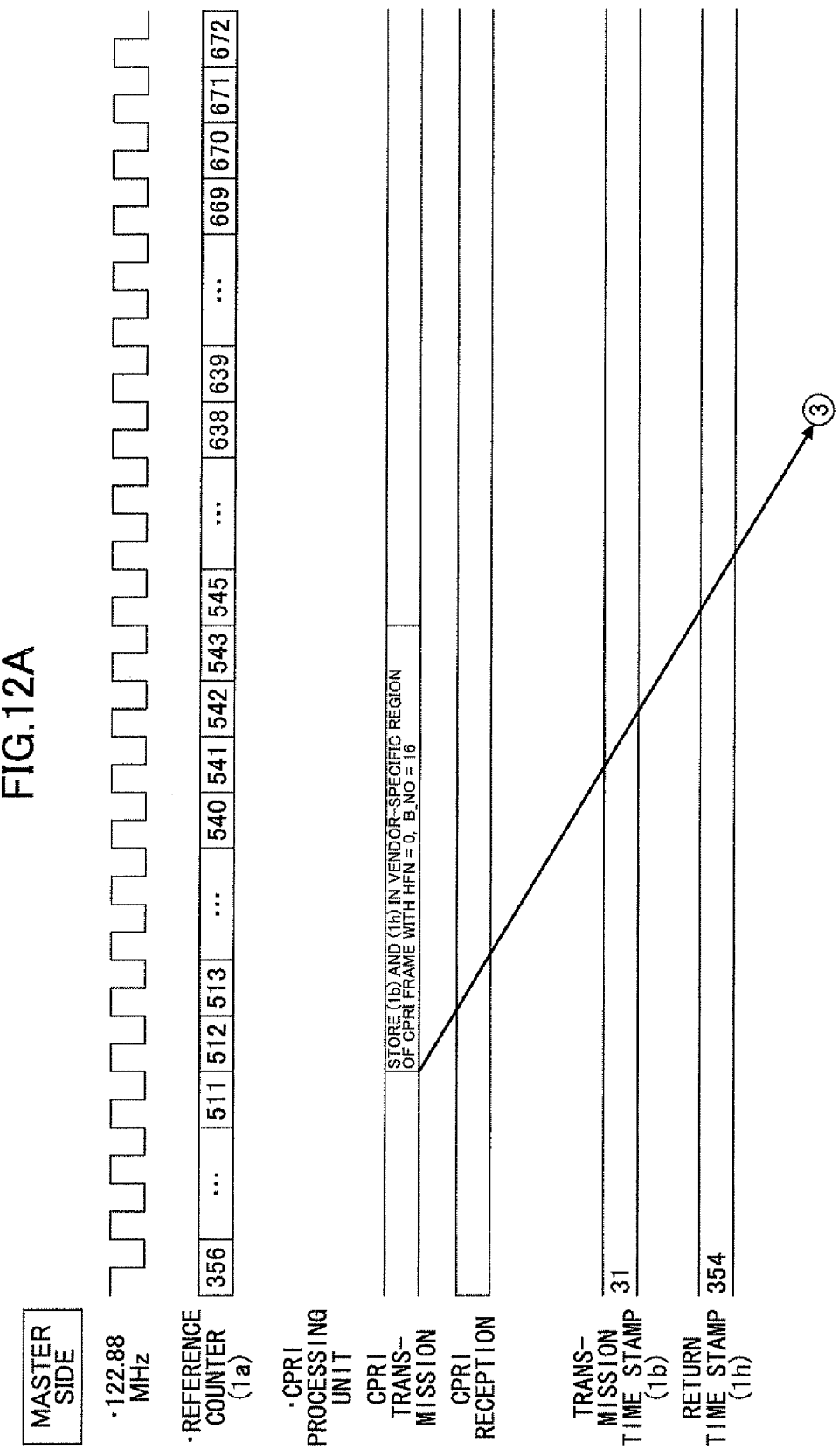

Next, as illustrated in FIGS. 11A and 11B, the CPRI processing unit 12 of the radio equipment control 10 stores the transmission time stamp of the transmission time stamp holding unit 14 and the return time stamp of the return time stamp holding unit 15 in the vendor-specific region of the CPRI frame and transmits the same to the radio equipment 20-1 serving as a slave. In FIGS. 12A and 12B, the CPRI processing unit 12 of the radio equipment control 10 transmits the transmission time stamp and the return time stamp by using the vendor-specific region of the CPRI frame with a HFN of 0 and a B_NO of 16.

As illustrated in FIGS. 12A and 12B, the radio equipment 20-1 receives the transmission time stamp (1b) and the return time stamp (1h) stored in the vendor-specific region from the radio equipment control 10. At this time, the radio equipment 20-1 has the master-side transmission time stamp ($1b$), the master-side return time stamp ($1h$), the slave-side reception time stamp ($1d$), and the slave-side transmission time stamp ($1e$) all together. By using all these time stamps, the radio equipment 20-1 can obtain a difference $\{(1d-1b)-(1h-1e)\}/2$ between the reference counter 13 and the reference counter 22.

In an example of FIGS. 12A and 12B, the above difference is calculated when the value of the reference counter 22 is "1929." Here, the slave-side reception time stamp value ($1d$) is 1416, the master-side transmission time stamp value ($1b$) is 31, the master-side return time stamp value ($1h$) is 354, and the slave-side transmission time stamp value ($1e$) is 1485. Therefore, the difference $\{(1416-31)-(354-1485)\}/2$ is 1258.

Accordingly, the value (the current count value of the reference counter 22–the difference=1929−1258=671) is obtained. In the next clock, "671" is incremented by "1" so as to set the count value of the reference counter 22 to "672." As a result, the reference counter 13 and the reference counter 22 are synchronized with each other.

In order to synchronize the transmission timing of the radio frame at the radio equipment 20-1 after the synchronization of the reference counters 13 and 22, the radio frame must be generated before a 10 msec frame. The CPRI processing unit 12 does not know the head position of the radio frame. Therefore, the baseband processing unit 11 must notify the CPRI processing unit 12 of the head position of the radio frame.

Figure 13:
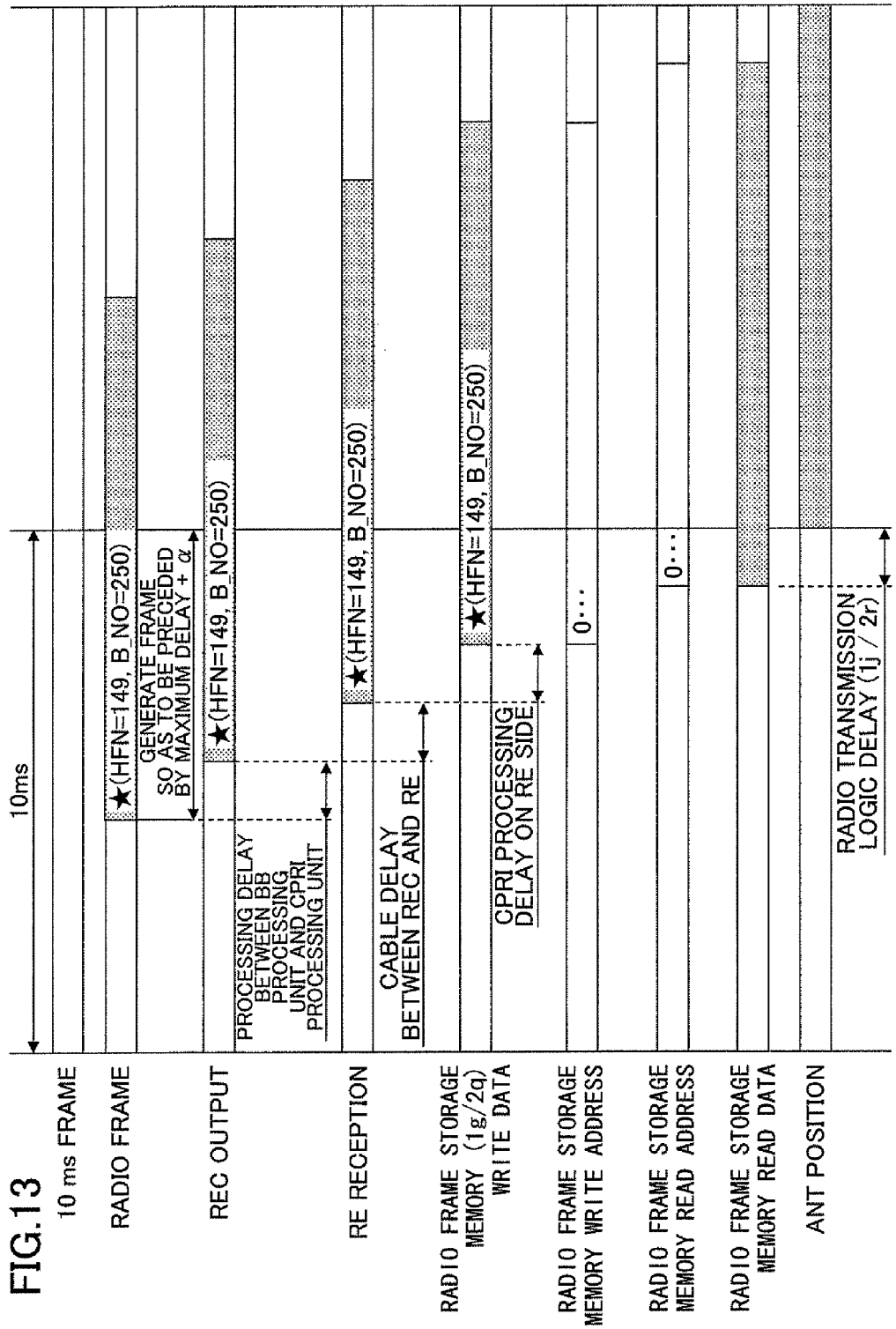
FIG. 13 is a signal timing chart according to the first embodiment.

In an example of FIG. 13, the position (HFN=149 and B_NO=250) is output as the head of the radio frame. The CPRI processing unit 12 transmits this information to the radio equipment 20-1 by using the vendor-specific region of the CPRI frame.

Until the radio frame reaches the CPRI processing unit 21 of the radio equipment 20-1, a processing delay between the BB processing unit and the CPRI processing unit, a cable delay between the radio equipment control and the radio equipment, and a delay at the CPRI processing unit of the radio equipment are caused. The time obtained by subtracting the above delays from the time generated by the radio equipment control before the 10 msec frame is corrected by the radio frame storage memory 23.

As described above, the position (HFN=149 and B_NO=250) is the head of the radio frame. Therefore, the data of the radio frame at this timing are stored as the write address (0) of the radio frame storage memory 23.

At a timing earlier by a radio transmission logic delay amount than a radio-frame transmission cycle every 10 msec, the radio frame data are read as the read address 0 of the radio frame storage memory 23. When the radio frame reaches the antenna 28 after the processing by the radio transmission and reception unit 26, the head of the radio frame is synchronized with the radio-frame transmission cycle every 10 msec with a high degree of accuracy.

(Second Embodiment)

Figure 14:
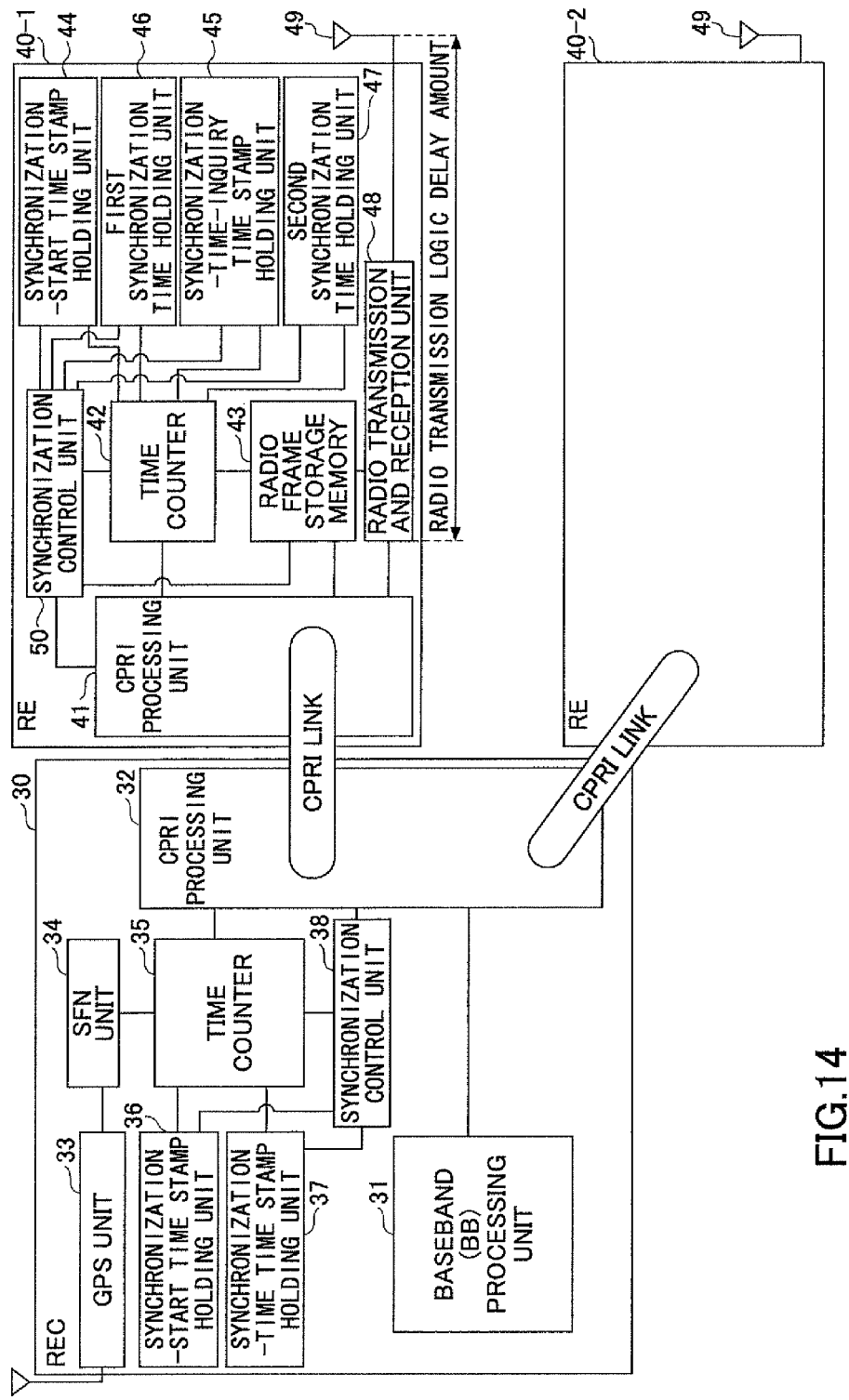
FIG. 14 is the configuration diagram of a second embodiment of the radio base station apparatus.

FIG. 14 illustrates the configuration diagram of a second embodiment of the radio base station apparatus. In this embodiment, a CPRI frame is used as a data frame. Plural pieces of radio equipment (RE) 40-1 and 40-2 are star-connected to a radio equipment control (REC) 30, thereby configuring the radio base station apparatus.

A baseband (BB) processing unit 31 of the radio equipment control 30 serving as a master generates a radio frame and notifies a CPRI processing unit 32 of the head position of the radio frame.

Figure 15:
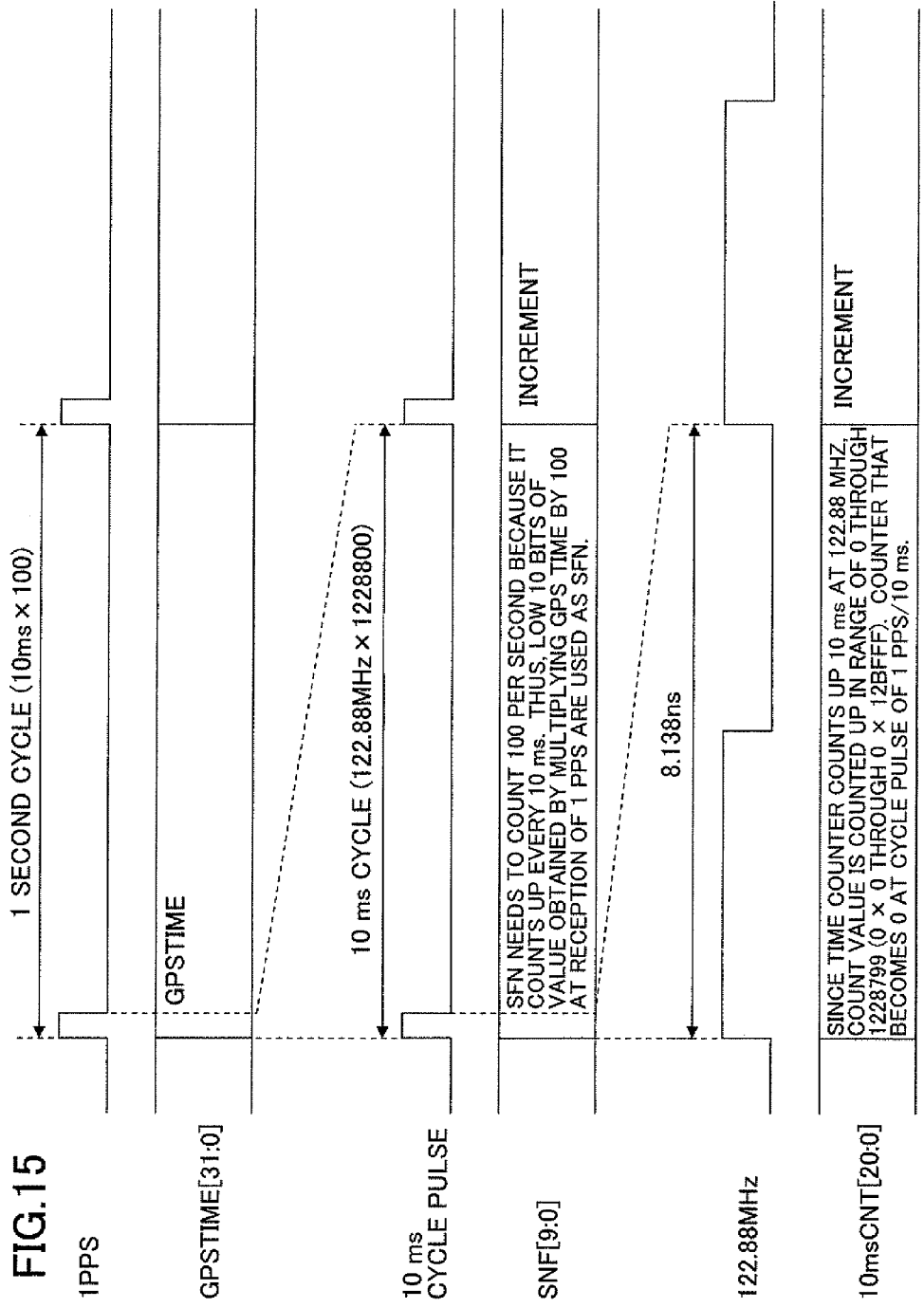
FIG. 15 is a diagram for explaining the generation of a time count value.

A GPS unit 33 notifies a SFN (System Frame Number) unit 34 of a GPS time (counted every one second) illustrated in FIG. 15 acquired from a GPS (Global Positioning System).

The SFN unit 34 counts up the GPS time (counted every one second) acquired from the GPS unit 33 every 10 msec and supplies the low 10 bits of the value obtained by multiplying the GPS time by 100 to a time counter 35 as a SFN value at the time of asserting a 1 PPS (pulse in a cycle of one second) signal illustrated in FIG. 15 received from the GPS unit 33.

A time counter 35 is a counter that counts up at a clock of 122.88 MHz based on the count value (counted every 10 msec) generated by the SFN unit 34. The time counter 35 counts in a range of 0 through 1228799 and increments the SFN value when the count value is 0. A time count value is obtained by adding the count value generated by the time counter 35 to the SFN number, which is illustrated in FIG. 15.

Note that in this embodiment, the SFN is generated from the GPS time. However, a synchronization unit may be in any form so long as the SFN value of an own radio base station is synchronized with the SFN values of other radio base stations.

A synchronization-start-frame transmission time stamp holding unit 36 holds a time count value ($2f$) of the time counter 35 when a synchronization start frame is transmitted.

A synchronization-time time stamp holding unit 37 holds a time count value ($2m$) of the time counter 35 when a synchronization-time-inquiry frame is received.

A CPRI processing unit 32 transmits and receives the CPRI frame and notifies a synchronization control unit 38 of the fact. Furthermore, the CPRI processing unit 32 transmits a synchronization start frame, a first synchronization time frame, and a second synchronization time frame, which are stored in a vendor-specific region and used for performing a transmission and a reception, to the radio equipment 40-1. Furthermore, the CPRI processing unit 32 stores the head position of the radio frame received from the baseband processing unit 31 in the vendor-specific region and transmits the same to the radio equipment 40-1.

The synchronization control unit 38 instructs the synchronization-start-frame transmission time stamp holding unit 36 and the synchronization-time time stamp holding 37 to hold their time count values. Furthermore, the synchronization control unit 38 instructs the CPRI processing unit 32 to generate the synchronization start frame, the first synchronization time frame, and the second synchronization time frame and transmit the same to the radio equipment 40-1.

Note that the synchronization start frame is a frame used for storing a code instructing a synchronization start in the vendor-specific region and transmitting the same from the radio equipment control 30 to the radio equipment 40-1.

The first synchronization time frame is a frame used for storing the time count value ($2f$) of the synchronization-start-frame transmission time stamp holding unit 36 in the vendor-specific region and transmitting the same from the radio equipment control 30 to the radio equipment 40-1.

The second synchronization time frame is a frame used for storing the time count value ($2m$) of the synchronization-time time stamp holding unit 37 in the vendor-specific region and transmitting the same from the radio equipment control 30 to the radio equipment 40-1.

A CPRI processing unit 41 serving as a slave transmits and receives the CPRI frame. The CPRI processing unit 41 notifies a time counter 42 and a synchronization control unit 50 of the reception of the synchronization start frame, the first synchronization time frame, and the second synchronization time frame. The CPRI processing unit 41 generates the synchronization-time inquiry frame and transmits the same to the synchronization-time time stamp holding unit 37 and notifies the time counter 42 of the fact. Furthermore, the CPRI processing unit 41 writes IQ data in a radio frame storage memory 43 from the head position of the radio frame stored in the vendor-specific region.

The synchronization-time inquiry frame is a frame used for storing a synchronization-time-inquiry time stamp in the vendor-specific region and transmits the same from the radio equipment 40-1 to the radio equipment control 30.

The time counter 42 generates a reference count value in a self-running manner by counting a clock pulse at non-synchronization time of 122.88 MHz. Furthermore, the time count value of the time counter 42 is corrected by the synchronization control unit 50.

The synchronization-start time stamp holding unit 44 holds the time count value ($2h$) of the time counter 42 when the synchronization start frame is received.

A first synchronization time holding unit 46 holds the synchronization-start-frame transmission time stamp ($2f$) stored in the first synchronization time frame.

A synchronization-time-inquiry time stamp holding unit 45 holds the time count value ($21$) of the time counter 42 when the synchronization-time inquiry frame is transmitted.

A second synchronization time holding unit 47 holds a synchronization-time time stamp ($2m$) stored in the second synchronization time frame.

A radio frame storage memory 43 stores radio frame data extracted by the CPRI processing unit 41 and reads the radio frame data when being requested by a radio transmission and reception unit 48.

The synchronization control unit 50 stores the time count value of the time counter 42 in the synchronization-start time stamp holding unit 44 at the time of receiving the reception report of the synchronization start frame from the CPRI processing unit 41. Furthermore, the synchronization control unit 50 stores the time count value of the time counter 42 in the synchronization-time-inquiry time stamp holding unit 45 at the time of receiving the transmission report of the synchronization-time inquiry frame.

Furthermore, the synchronization control unit 50 stores the synchronization-start-frame transmission time stamp ($2f$) in the first synchronization time holding unit 46 at the time of receiving the first synchronization time frame. Furthermore, the synchronization control unit 50 stores the synchronization-time time stamp ($2m$) in the second synchronization time holding unit 47 at the time of receiving the second synchronization time frame.

Furthermore, at the time of receiving the second synchronization time frame, the synchronization control unit 50 calculates a difference between the time counter 35 and the time counter 42 from the time stamp values stored in the synchronization-start time stamp holding unit 44, the synchronization-time-inquiry time stamp holding unit 45, the first synchronization time holding unit 46, and the second synchronization time holding unit 47, and corrects the time counter 42.

A radio transmission logic delay amount is determined according to a logic delay and a cable delay from the radio transmission and reception unit 48 to an antenna 49. The radio transmission and reception unit 48 reads from the radio frame storage memory 43 radio frame data earlier by the radio transmission logic delay amount than a timing for starting the transmission of the radio frame data to the antenna 49 and supplies the same to the antenna 49. Note that the radio equipment 40-2 has the same configuration as that of the radio equipment 40-1.

(Operations Sequence According to Second Embodiment)

Figure 16:
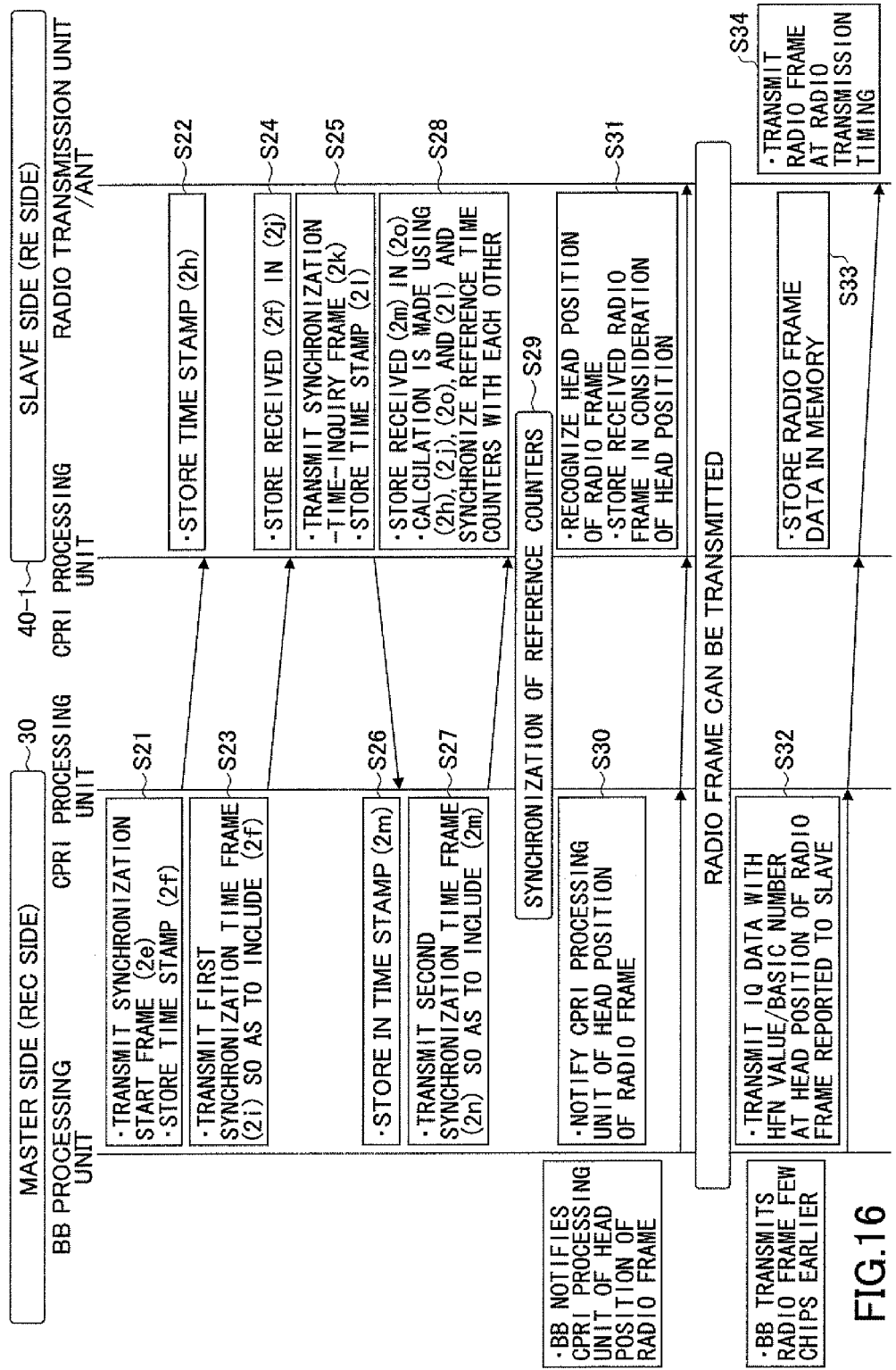
FIG. 16 is an operations sequence diagram according to the second embodiment.

FIG. 16 is the operations sequence according to a second embodiment. As illustrated in FIG. 16, in the radio equipment control 30, the SFN unit 34 generates the SFN value based on the GPS TIME value received from the GPS unit 33, and the time counter 35 generates the time count value in combination with the SFN value. The radio equipment control 30 stores the code of the synchronization start frame in the vendor-specific region of the CPRI frame and transmits the same to the radio equipment 40-1. At this time, the radio equipment control 30 holds the time count value in the synchronization-start-frame transmission time stamp holding unit 36 as the synchronization-start-frame transmission time stamp ($2f$) (S21).

At the time of receiving the synchronization start frame, the radio equipment 40-1 holds the time count value of the time counter 42 in the synchronization-start time stamp holding unit 44 as the synchronization-start time stamp ($2h$) (S22).

After the transmission of the synchronization start frame, the radio equipment control 30 successively generates the first synchronization time frame storing the synchronization-start-frame transmission time stamp ($2f$) of the synchronization-start-frame transmission time stamp holding unit 36 and transmits the same to the radio equipment 40-1 (S23).

After the reception of the first synchronization time frame, the radio equipment 40-1 holds the time stamp stored in the first synchronization time frame in the first synchronization time holding unit 46 as a synchronization-start-frame transmission time stamp ($2j$) (S24).

After the reception of the first synchronization time frame, the radio equipment 40-1 generates the synchronization time inquiry frame and transmits the same to the radio equipment control 30. At that time, the radio equipment 40-1 holds the time count value of the time counter 42 in the synchronization-time-inquiry time stamp holding unit 45 as a synchronization-time-inquiry time stamp ($2l$) (S25).

At the time of receiving the synchronization time inquiry frame, the radio equipment control 30 holds the time count value of the time counter 35 in the synchronization-time time stamp holding unit 37 as the synchronization-time time stamp ($2m$) (S26). Then, the radio equipment control 30 stores the value ($2m$) of the synchronization-time time stamp holding unit 37 in the second synchronization frame and transmits the same to the radio equipment 40-1 (S27).

After the reception of the second synchronization time frame, the radio equipment 40-1 holds the time stamp stored in the second synchronization time frame in the second synchronization time holding unit 47 as a synchronization-time time stamp ($2o$). Then, by using the synchronization-start time stamp ($2h$), the synchronization-start-frame transmission time stamp ($2j$), the synchronization-time-inquiry time stamp ($2l$), and the synchronization-time time stamp ($2o$) held in the holding units 44, 45, and 46, the radio equipment 40-1 calculates a difference between a count value of the time counter 35 and that of the time counter 42 and a cable delay. Note that the calculation of the cable delay is not necessarily required.

$$\text{Difference} = \{(2h-2j)-(2o-2l)\}/2$$

$$\text{Cable delay} = \{(2h-2j)+(2o-2l)\}/2$$

The synchronization control unit 50 sets a calculated difference to the time counter 42, thereby matching and synchronizing the time count value of the time counter 42 and that of the time counter 35 with each other (S28 and S29).

In order to make the head of the radio frame align at the position of the antenna 49, the radio equipment 40-1 needs to know which position of the CPRI frame the head of the radio frame is stored. Therefore, the baseband processing unit 31 notifies the CPRI processing unit 32 of the head position of the radio frame. By using the vendor-specific region, the CPRI processing unit 32 transmits the HFN value and the N_NO value of the CPRI frame, which store the IQ data of the head of the radio frame, i.e., the head position of the radio frame, to the radio equipment 40-1 (S30).

The CPRI processing unit 41 of the radio equipment 40-1 extracts the HFN value and the N_NO value of the CPRI frame which store the IQ data of the head of the radio frame and notifies the synchronization control unit 50 of the same. Thus, the synchronization control unit 50 can sequentially write the IQ data of the head of the radio frame in the radio frame storage memory 43 so as to be positioned at the initial address (0) of the radio frame storage memory 43 (S31).

The radio equipment control 30 transmits the IQ data to the radio equipment 40-1 in such a manner as to be preceded by a few chips in addition to a maximum delay up to the antenna 49 so that the radio equipment 40-1 affords to absorb a variation (S32). At this time, the HFN value and the N_NO value of the CPRI frame which store the IQ data of the head of the radio frame are referred to those transmitted in step S30.

The radio equipment 40-1 temporarily stores the IQ data of the received CPRI frame in the radio frame storage memory 43. At this time, the IQ data (the HFN value and the N_NO value have been already reported to the synchronization control unit 50) of the head of the radio frame are stored in the head address (0) of the radio frame storage memory 43 (S33).

The radio transmission and reception unit 46 sequentially reads the IQ data from the initial address of the radio frame storage memory 43 and generates the radio frame so as to be synchronized with a radio-frame transmission cycle every 10 msec (synchronized with the time counter 42). Then, the radio transmission and reception unit 46 transmits the radio frame from the radio equipment (S34).

As described above, the time count values of all the radio equipment 40-1 and 40-2, which are star-connected to the radio equipment control 30, are synchronized with the time count value of the radio equipment control 30, thereby making it possible to synchronize the transmission timings at the antenna positions of all the radio equipment 40-1 and 40-2 with each other. Thus, as illustrated in FIG. 17, the radio frame can have less time variation at an antenna output.

In this embodiment, the synchronization-start-frame transmission time stamp holding unit 36 is used as an example of the first-transmission-value holding unit; the synchronization-start time stamp holding unit 44 is used as an example of the first-reception-value holding unit; the synchronization-time-inquiry time stamp holding unit 45 is used as an example of the second-transmission-value holding unit; the synchronization-time time stamp holding unit 37 is used as an example of the second-reception-value holding unit; the CPRI processing unit 32 is used as an example of the transmission-and-reception-value transmitting unit; the synchronization control unit 50 is used as an example of the synchronization unit; and the CPRI processing unit 32 is used as an example of the head-position transmitting unit.

(Signal Timing Chart According To Second Embodiment)

FIGS. 18 through 21 illustrate signal timing charts according to the second embodiment. Here, a time stamp is acquired at the position of the last data of each basic frame.

Figure 18B:
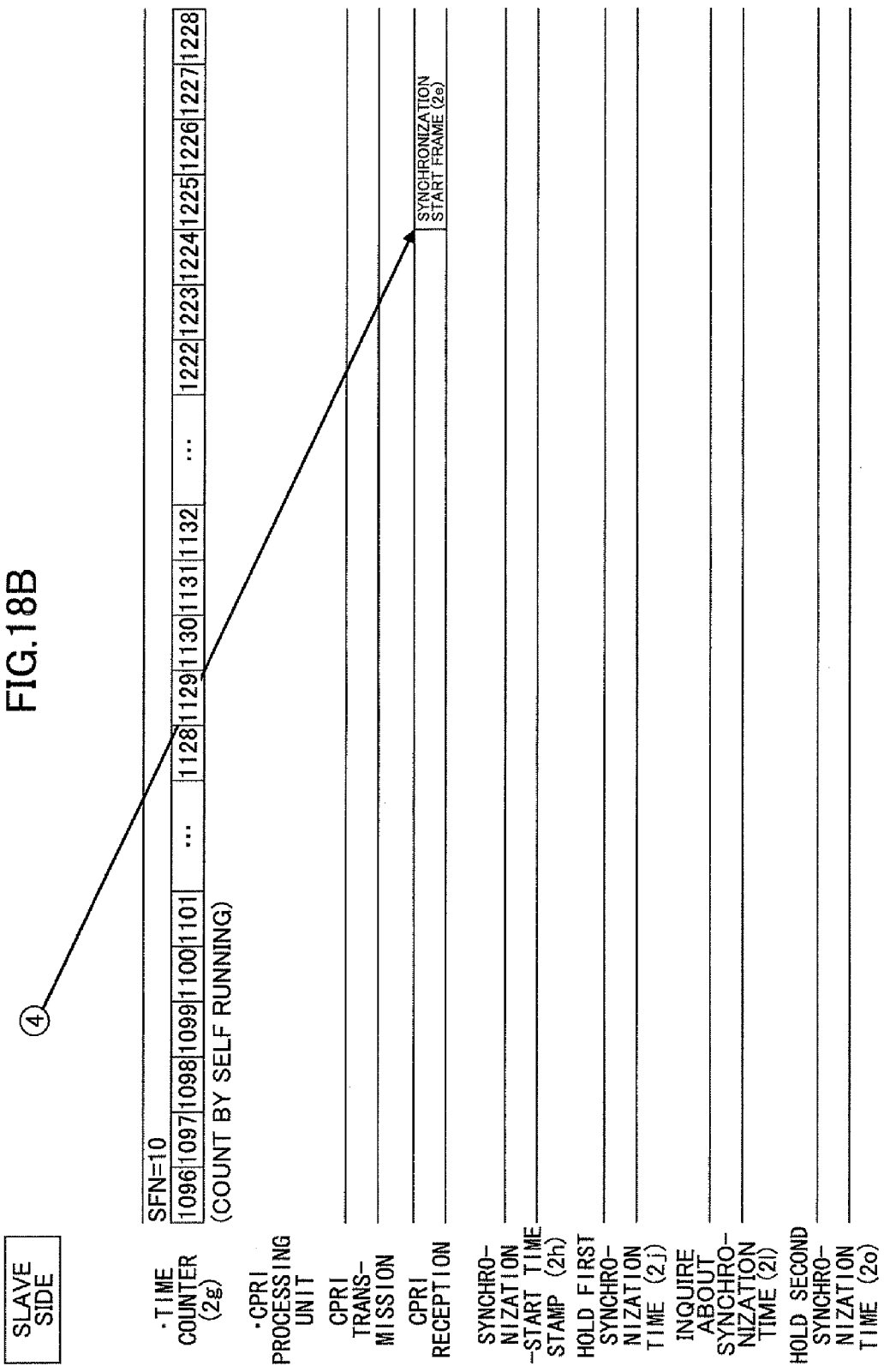

As illustrated in FIGS. 18A and 18B, the time counter 35 of the radio equipment control 30 generates a time count value by combining a SFN value (0 through 1023) with a count value (0 through 1228799) counted every 10 msec. The time count value is indicated as (122, 1228671) when the SFN value is 122 and the count value is 1228671.

As illustrated in FIGS. 18A and 18B, the synchronization start frame is first transmitted from the CPRI processing unit 32 of the radio equipment control 30. The radio equipment control 30 stores the time count value "122, 1228671" of the time counter 35 at the position of the last data of the synchronization start frame in the synchronization-start time stamp holding unit 36.

As illustrated in FIGS. 19A and 19B, the radio equipment 40-1 stores the time count value "10, 1256" of the time counter 42 (which is running in this case) at the time of receiving the last data of the synchronization start frame transmitted from the radio equipment control 30 in the synchronization-start time stamp holding unit 44.

Then, the radio equipment control 30 successively transmits the first synchronization time frame including the synchronization-start time stamp of the synchronization-start time stamp holding unit 36 to the radio equipment 40-1.

The radio equipment 40-1 extracts the synchronization-start time stamp "122, 1228671" stored in the first synchronization time frame and stores the same in the first synchronization time storage unit 46.

Figure 20A:
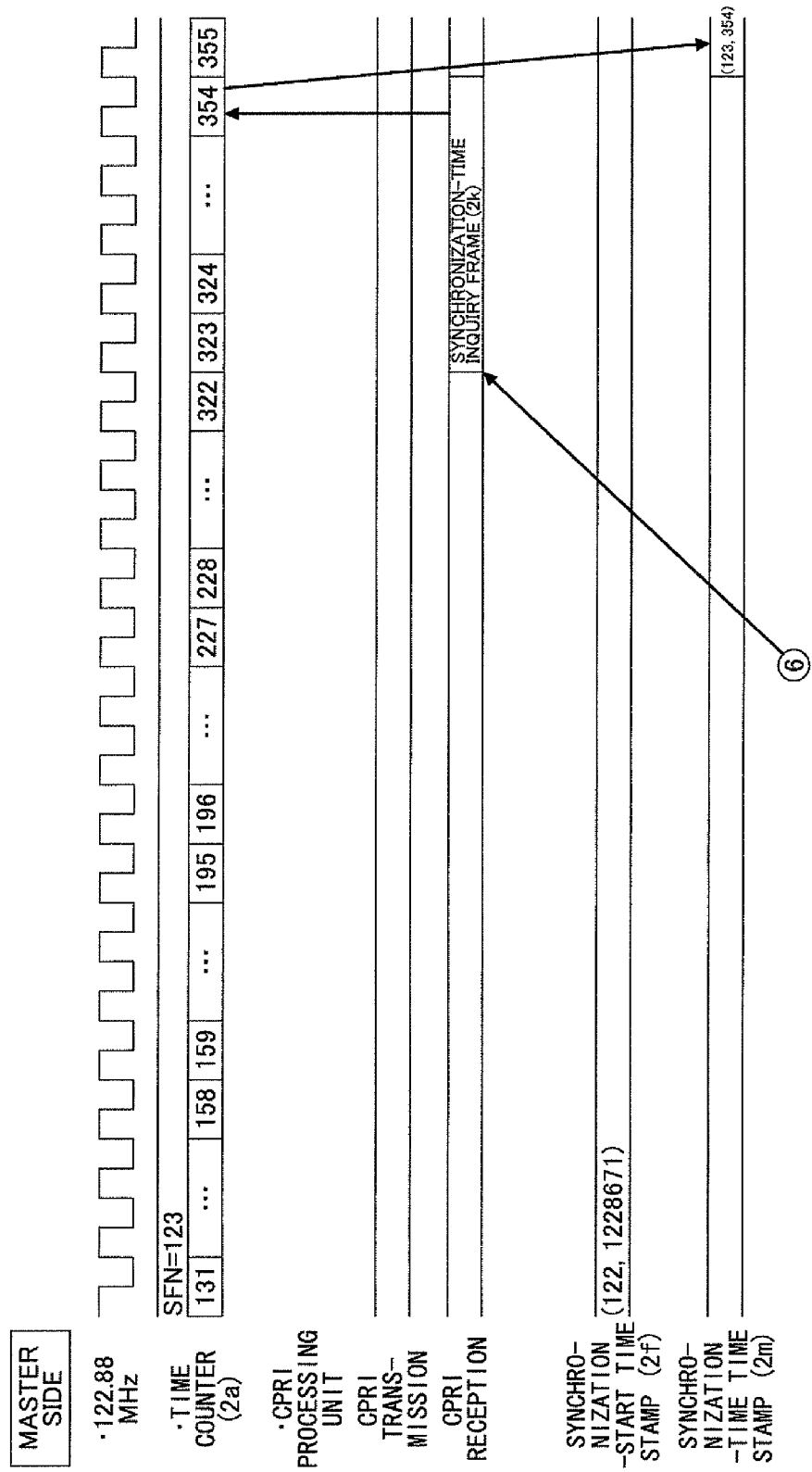
FIGS. 20A and 20B are signal timing charts according to the second embodiment.
Figure 20B:
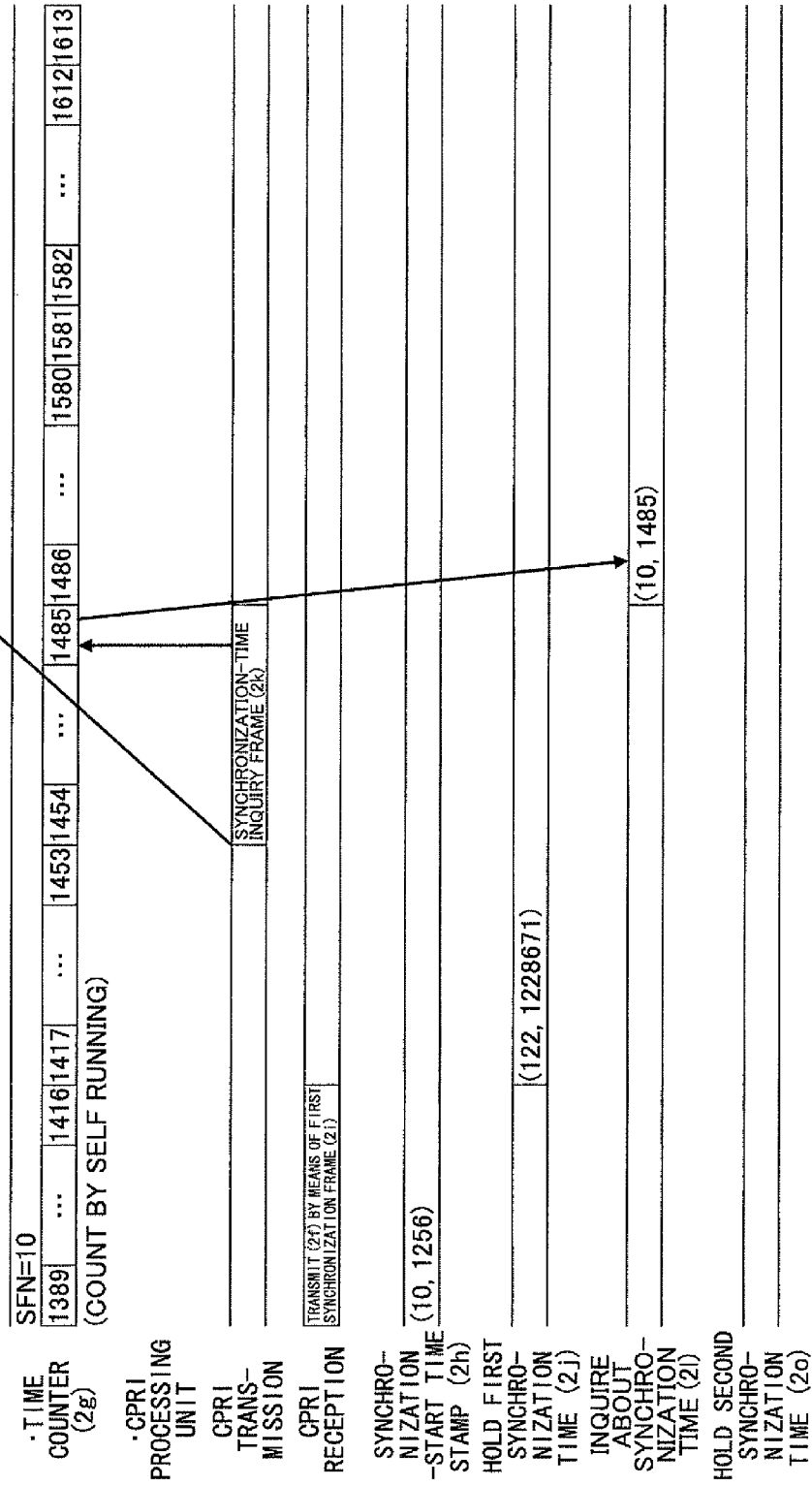

As illustrated in FIGS. 20A and 20B, the radio equipment 40-1 transmits the synchronization-time inquiry frame to the radio equipment control 30. Furthermore, the radio equipment 40-1 stores the time count value "10, 1485" of the time counter 42 at the position of the last data of the synchronization-time inquiry frame in the synchronization-time-inquiry time stamp holding unit 45.

The radio equipment control 30 stores the time count value "123, 354" of the time counter 35 at the time of receiving the last data of the synchronization-time inquiry frame in the synchronization-time time stamp holding unit 37.

Figure 21A:
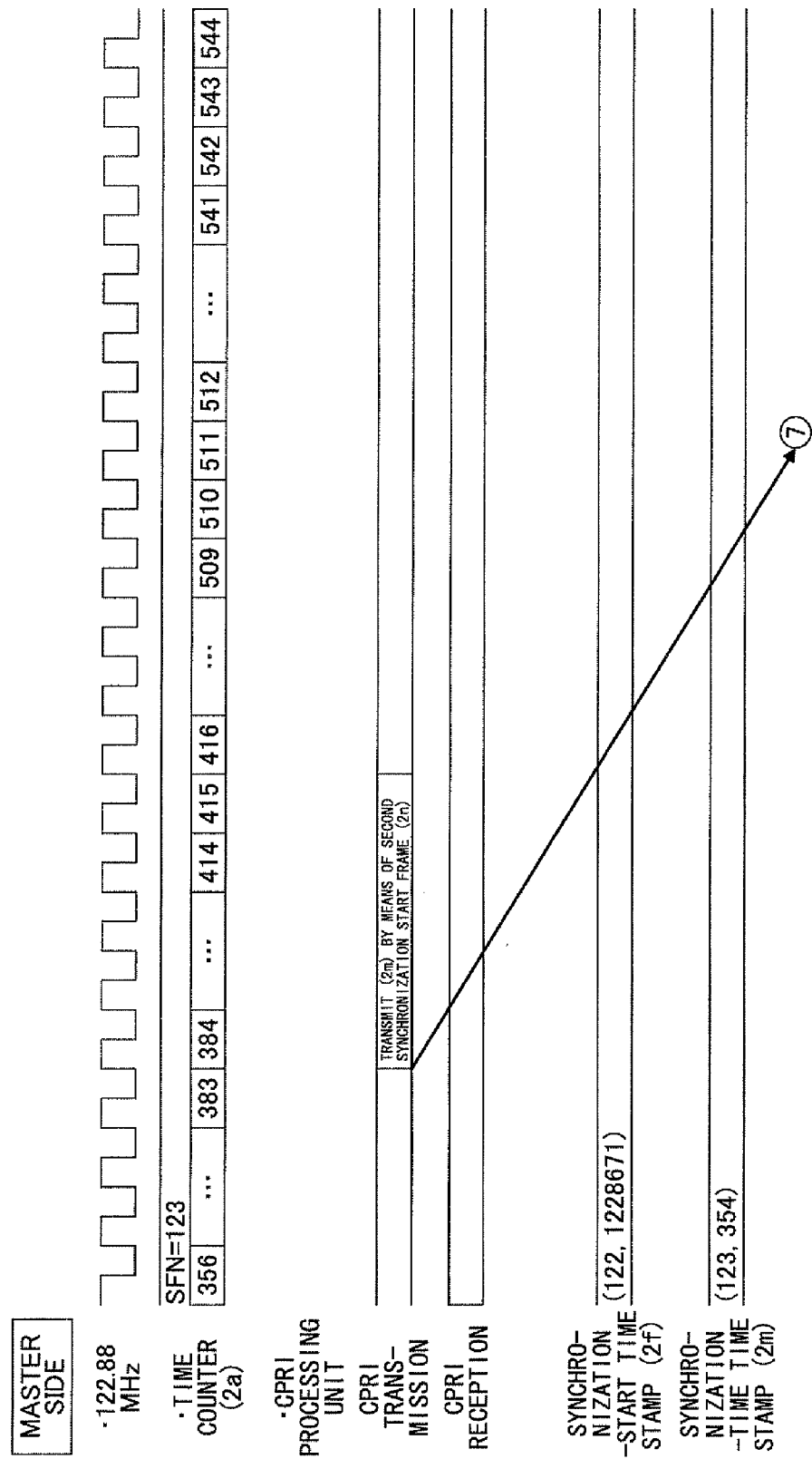
FIGS. 21A and 21B are signal timing charts according to the second embodiment.
Figure 21B:
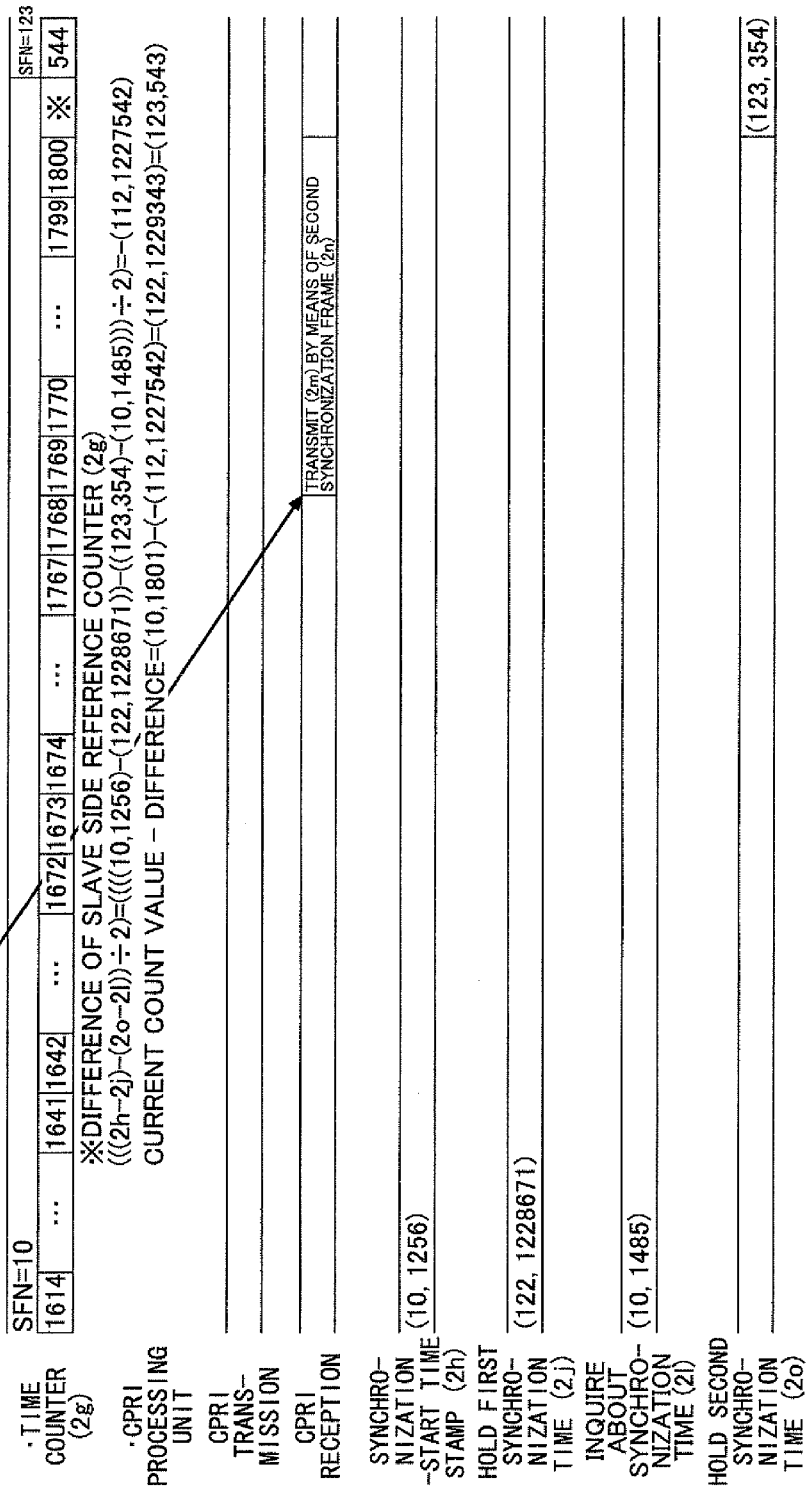

As illustrated in FIGS. 21A and 21B, the radio equipment control 30 transmits the synchronization time stamp of the synchronization-time time stamp holding unit 37 to the radio equipment 40-1 so as to be included in the second synchronization time frame.

The radio equipment 40-1 stores the synchronization-time time stamp "123, 354" of the received second synchronization time frame in the second synchronization time storage unit 47.

Thus, the radio equipment 40-1 has the synchronization-start time stamp ($2h$), the synchronization-start time stamp ($2j$) of the first synchronization time storage unit 46, the synchronization-time-inquiry time stamp ($2l$), and the synchronization-time time stamp ($2o$) of the second synchronization time storage unit 47 all together. By using all these stamps, the radio equipment 40-1 can obtain a difference [{($2h-2j$)−($2o-2l$)}/2] between the time counter 35 and the time counter 42.

In an example of FIGS. 21A and 21B, the above difference is calculated when the count value of the time counter 42 is "10, 1801." Here, the synchronization-start time stamp ($2h$) is "10, 1256," the synchronization-start time stamp ($2j$) is "122, 1228671," the synchronization-time-inquiry time stamp ($2l$) is "10, 1485," and the synchronization-time time stamp ($2o$) is "123, 354." Therefore, the difference, [{ ("10, 1256"−"122, 1228671")−("123, 354"−"10, 1485")}/2]=−(112, 1227542), is obtained.

Accordingly, the current count value of the time counter 42−the difference="10, 1801"−(−"112, 1227542")="122, 1229343"="123, 543" is obtained. In the next clock, "123, 543" is incremented by "1" so as to set the time count value of the time counter 42 to "123, 544." As a result, the time counter 35 and the time counter 42 are synchronized with each other.

Since a method for synchronizing the transmission timing of the radio frame at the radio equipment 40-1 after the synchronization of the time counters 35 and 42 is the same as that of the first embodiment, its detailed explanation is omitted.

Note that the number of bytes of a control word of one basic frame is different depending on the bit rate of the CPRI. For example, the number of bytes of a control word of one basic frame is 614.4 Mbit/s, two bytes when the bit rate is 1228.8 Mbit/s, four bytes when the bit rate is 2457.6 Mbit/s, and five bytes when the bit rate is 3072.0 Mbit/s.

Therefore, the time stamp may not be transmitted by the vendor-specific region of one basic frame. In this case, the time stamp is transmitted by plural vendor-specific regions and reproduced from information of the plural vendor-specific regions on a reception side. The same applies to the embodiment in which the reference count value is transmitted.

(Third Embodiment)

Figure 22:
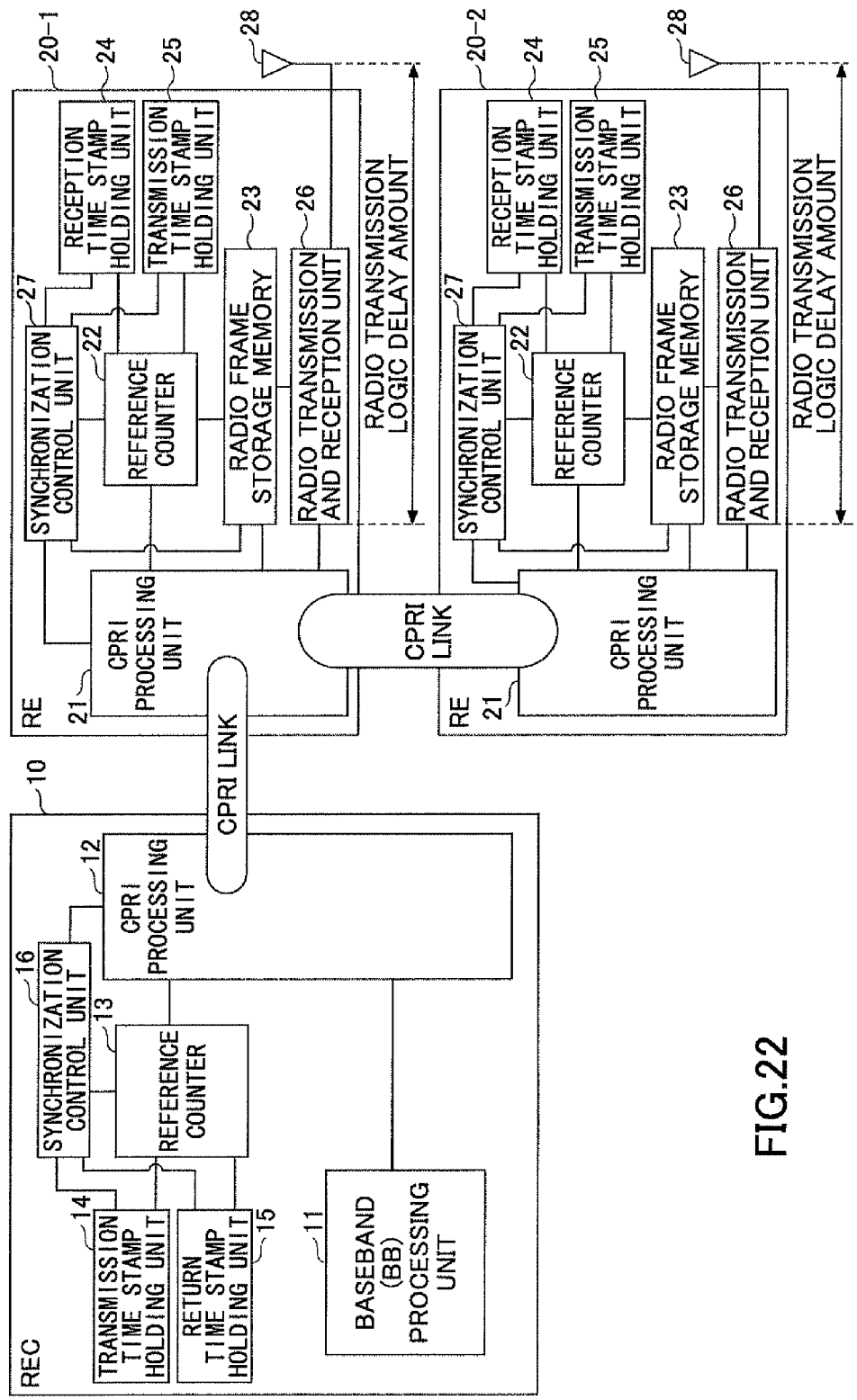
FIG. 22 is the configuration diagram of a third embodiment of the radio base station apparatus.

FIG. 22 illustrates the configuration diagram of a third embodiment of the radio base station apparatus. In FIG. 22, components the same as those of FIG. 6 are denoted by the same reference numerals and their descriptions are omitted here. In this embodiment, a CPRI frame is used as a data frame. The radio equipment 20-1 is connected to the radio equipment control 10, and the radio equipment 20-2 is connected to the radio equipment 20-1. That is, the radio equipment 20-1 and the radio equipment 20-2 are cascade-connected to the radio equipment control 10.

In this case, the reference counter 13 of the radio equipment control 10 serving as a master and the reference counter 22 of the radio equipment 20-1 serving as a slave are first synchronized with each other. The synchronization of the reference counter 13 and the reference counter 22 is performed in the same manner as that of the first embodiment (S1 through S9 in FIG. 8).

After the synchronization of the reference counter 13 of the radio equipment control 10 and the reference counter 22 of the radio equipment 20-1, the reference counter 22 of the radio equipment 20-1 and the reference counter 22 of the radio equipment 20-2 are synchronized with each other. In this case, the radio equipment 20-1 having the counter serving as a reference is used as a master, and the radio equipment 20-2 whose count value is adjusted is used as a slave. In this case, the synchronization is also performed in the same manner as that of the first embodiment (S1 through S9 in FIG. 8). At this time, the reception time stamp holding unit 24 and the transmission time stamp holding unit 25 of the radio equipment 20-1 are used as the transmission time stamp holding unit 14 and the return time stamp holding unit 15, respectively.

In order to make the head of the radio frame align at the positions of the antennas 28 of the radio equipment 20-1 and the radio equipment 20-2, the radio equipment 20-1 and the radio equipment 20-2 need to know which position of the CPRI frame the head of the radio frame is stored. Therefore, the baseband processing unit 11 of the radio equipment control 10 notifies the CPRI processing unit 12 of the head position of the radio frame. Then, by using the vendor-specific region of the CPRI frame, the CPRI processing unit 12 transmits the HFN value and the B_NO value of the head of the radio frame, which store the head position of the radio frame, to the radio equipment 20-1 and the radio equipment 20-2 (S8 and S9 in FIG. 8).

Distances from the radio equipment control 10 to the antenna 28 are different between the radio equipment 20-1 and the radio equipment 20-2, and timings for transmitting the radio frame are different between the radio equipment 20-1 and the radio equipment 20-2. Therefore, the radio equipment control 10 transmits the HFN value and the N_NO value of the CPRI frame, in which the IQ data of the head of the radio frame to be stored are different between the radio equipment 20-1 and the radio equipment 20-2, to the radio equipment 20-1 and the radio equipment 20-2.

Thus, the transmission timings of the same radio frame at the antennas 28 of the radio equipment 20-1 and the radio equipment 20-2, which are cascade-connected to the radio equipment control 10, can be synchronized with each other.

(Fourth Embodiment)

Figure 23:
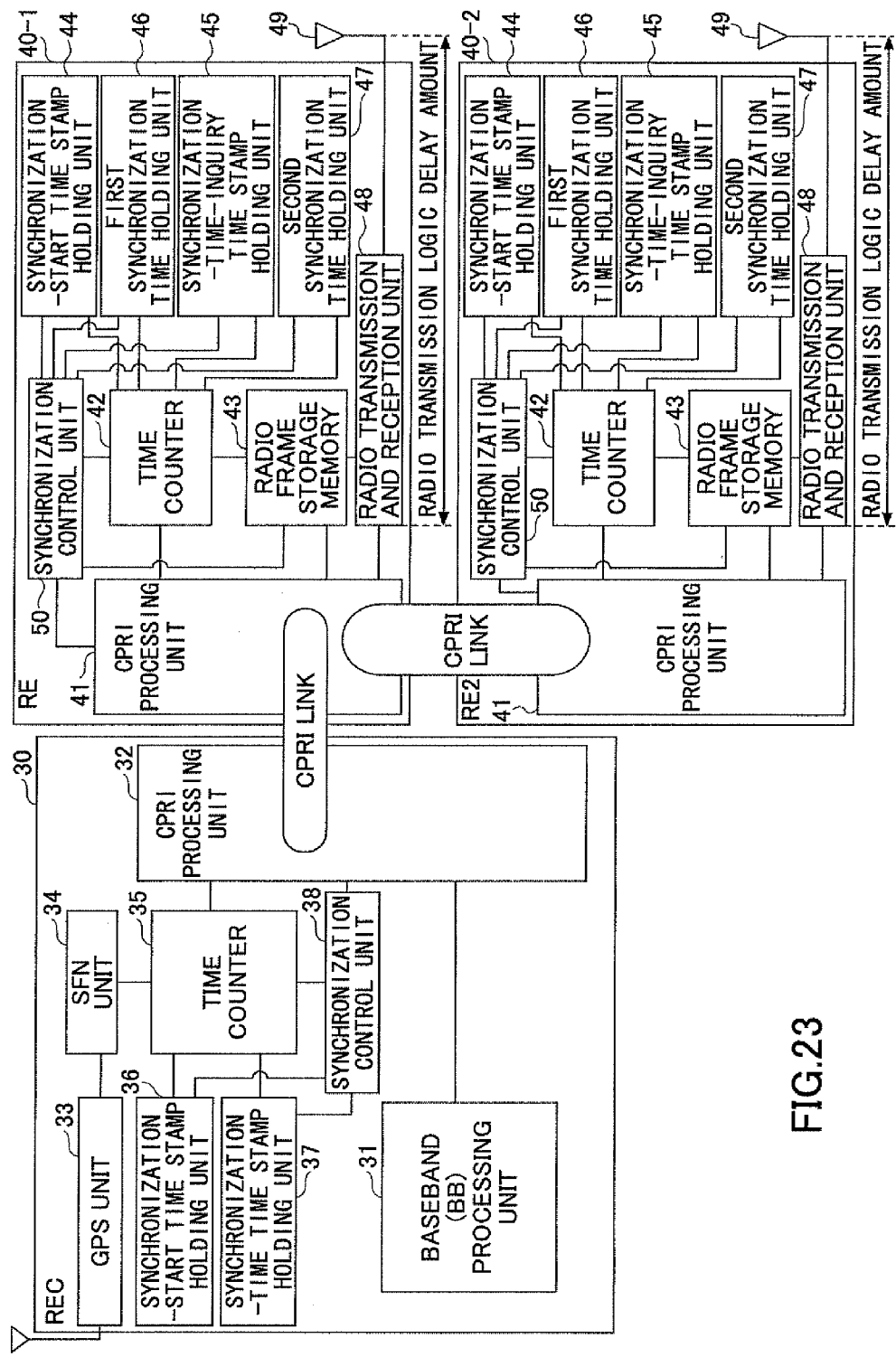
FIG. 23 is the configuration diagram of a fourth embodiment of the radio base station apparatus.

FIG. 23 illustrates the configuration diagram of a fourth embodiment of the radio base station apparatus. In FIG. 23, components the same as those of FIG. 14 are denoted by the same reference numerals and their descriptions are omitted here. In this embodiment, a CPRI frame is used as a data frame. The radio equipment 40-1 is connected to the radio equipment control 30, and the radio equipment 40-2 is connected to the radio equipment 40-1. That is, the radio equipment 40-1 and the radio equipment 40-2 are cascade-connected to the radio equipment control 30.

In this case, the time counter 35 of the radio equipment control 30 serving as a master and the time counter 42 of the radio equipment 40-1 serving as a slave are first synchronized with each other. The synchronization of the time counter 35 and the time counter 42 is performed in the same manner as that of the second embodiment (S21 through S28 in FIG. 16).

After the synchronization of the time counter 35 of the radio equipment control 30 and the time counter 42 of the radio equipment 40-1, the time counter 35 of the radio equipment 40-1 and the time counter 42 of the radio equipment 40-2 are synchronized with each other. In this case, the radio equipment 40-1 having the counter serving as a reference is used as a master, and the radio equipment 40-2 whose count value is adjusted is used as a slave. In this case also, the synchronization is performed in the same manner as that of the second embodiment (S21 through S28 in FIG. 16). At this time, the synchronization-start time stamp holding unit 44 and the synchronization-time-inquiry time stamp holding unit 45 of the radio equipment 40-1 are used as the synchronization-start-frame time stamp holding unit 36 and the synchronization-time time stamp holding unit 37, respectively.

In order to make the head of the radio frame align at the positions of the antennas 49 of the radio equipment 40-1 and the radio equipment 40-2, the radio equipment 40-1 and the radio equipment 40-2 need to know which position of the CPRI frame the head of the radio frame is stored. Therefore, the baseband processing unit 31 of the radio equipment control 30 notifies the CPRI processing unit 32 of the head position of the radio frame. Then, by using the vendor-specific region of the CPRI frame, the CPRI processing unit 32 transmits the HFN value and the B_NO value of the head of the radio frame, which store the head position of the radio frame, to the radio equipment 40-1 and the radio equipment 40-2 (S30 and S31 in FIG. 16).

Distances from the radio equipment control 30 to the antennas 49 are different between the radio equipment 40-1 and the radio equipment 40-2, and timings for transmitting the radio frame are different between the radio equipment 40-1 and the radio equipment 40-2. Therefore, the radio equipment control 30 transmits the HFN value and the N_NO value of the CPRI frame, in which the IQ data of the head of the radio frame to be stored are different between the radio equipment 40-1 and the radio equipment 40-2, to the radio equipment 40-1 and the radio equipment 40-2.

Thus, the transmission timings of the same radio frame at the antennas 49 of the radio equipment 40-1 and the radio equipment 40-2, which are cascade-connected to the radio equipment control 30, can be synchronized with each other.

(Fifth Embodiment)

When 4×4 MIMO (Multiple-Input Multiple-Output) is performed at 20 Mpbi, one radio equipment must have two CPRI_LINKs. This is because one CPRI_Link is allowed to transmit only information equivalent to two antennas at 20 Mbpi.

In this case, the reference counter of the radio equipment maybe adjusted in accordance with the reference counter of a radio equipment control for each CPRI_LINK. However, provision of the plural reference counters causes waste in terms of a circuit size or the like. Therefore, one reference counter is used as a common reference counter in the radio equipment, and the reference counter of the radio equipment is synchronized with the reference counter of the radio equipment control by the use of one of the CPRI_LINKs. In other words, the common reference counter is shared by the two CPRI_LINKs.

Figure 24:
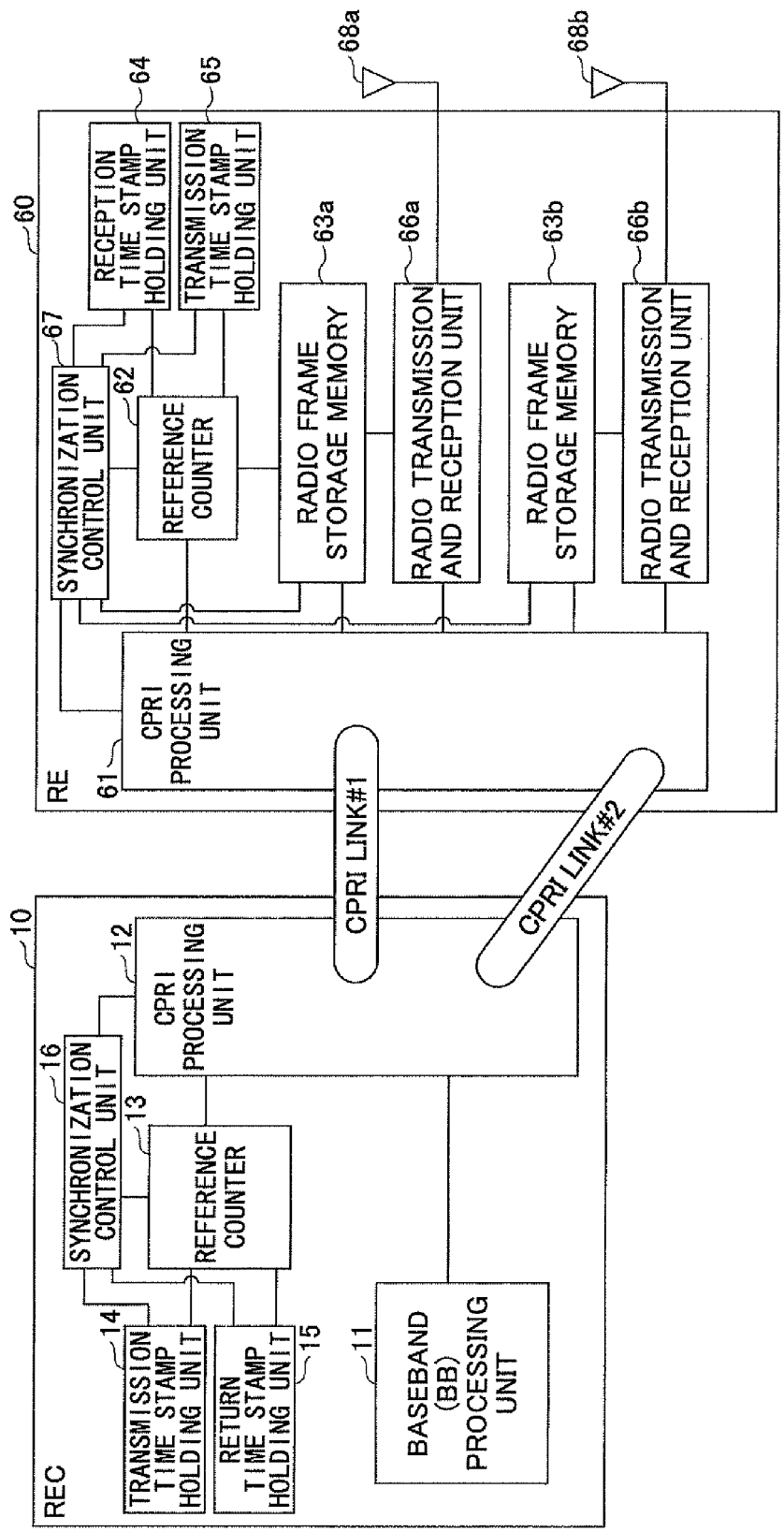
FIG. 24 is the configuration diagram of a fifth embodiment of the radio base station apparatus.

FIG. 24 illustrates the configuration diagram of a fifth embodiment of the radio base station apparatus. In FIG. 24, components the same as those of FIG. 6 are denoted by the same reference numerals. In this embodiment, a CPRI frame is used as a data frame.

Radio equipment 60 is connected to the radio equipment control 10 by CPRI_LINKs #1 and #2, thereby configuring the radio base station for MIMO.

The baseband processing unit 11 of the radio equipment control 10 serving as a master generates a radio frame and notifies the CPRI processing unit 12 of the head position of the radio frame.

The reference counter 13 generates a reference count value synchronized with a system frame number (SFN) by counting a clock pulse.

The transmission time stamp holding unit 14 holds a reference count value when the CPRI frame with a hyper frame number (HFN) value of 0 and a basic frame number (B_NO) value of 0 is transmitted.

The return time stamp holding unit 15 holds a master-side reference count value when the CPRI frame with a hyper frame number (HFN) value of 0 and a basic frame number (B_NO) value of 0 is received.

The CPRI processing unit 12 transmits and receives the CPRI frame by using the CPRI_LINKs #1 and #2 and notifies a synchronization control unit 16 of the fact. Furthermore, the CPRI processing unit 12 stores the head position of the radio frame received from the baseband processing unit 11 in a vendor-specific region and transmits the same to the radio equipment 60.

The synchronization control unit 16 instructs the transmission time stamp holding unit 14 and the return time stamp holding unit 15 to hold their time stamp values. Furthermore, the synchronization control unit 16 instructs the CPRI processing unit 12 to store the time stamp values held in the transmission time stamp holding unit 14 and the return time stamp holding unit 15 in the vendor-specific region of the CPRI frame and transmit the same to the radio equipment 60.

A CPRI processing unit 61 of the radio equipment 20-1 serving as a slave transmits and receives the CPRI frame by using the CPRI_LINKs #1 and #2 and notifies a synchronization control unit 67 of the fact. The CPRI processing unit 61 notifies a reference counter 62 of the time stamp value stored in the vendor-specific region of the received CPRI frame. Furthermore, the CPRI processing unit 61 writes IQ data in radio frame storage memories 63a and 63b from the head of the radio frame stored in the vendor-specific region.

The reference counter 62 generates a reference count value in a self-running manner by counting a clock pulse at non-synchronization time. Furthermore, the reference count value of the reference counter 62 is corrected by the synchronization control unit 67.

A reception time stamp holding unit 64 stores the reference count value of the reference counter 62 when the CPRI frame with a HFN value of 0 and a B_NO value of 0 is received.

A transmission time stamp holding unit 65 stores the value of the reference counter 62 when the slave transmits the CPRI frame with a HFN value of 0 and a B_NO value of 0 to the master.

A radio frame storage memory 63a stores the radio frame data of the CPRI_LINK #1 extracted by the CPRI processing unit 61 and reads the same when being requested by a radio transmission and reception unit 66a.

A radio frame storage memory 63b stores the radio frame data of the CPRI_LINK #2 extracted by the CPRI processing unit 61 and reads the same when being requested by a radio transmission and reception unit 66b.

The synchronization control unit 67 instructs the reception time stamp holding unit 64 and the transmission time stamp holding unit 65 to hold their time stamp values. Furthermore, the synchronization control unit 67 calculates a difference between a count value of the reference counter 62 and that of the reference counter 13 from the time stamp value notified from the CPRI processing unit 61 and the time stamp values stored in the reception time stamp holding unit 64 and the transmission time stamp holding unit 65, and corrects the reference counter 62 based on the difference.

Meanwhile, a radio transmission logic delay amount is determined according to a logic delay and a cable delay from the radio transmission and reception unit 66a to an antenna 68a and a logic delay and a cable delay from the radio transmission and reception unit 66b to an antenna 68b. The radio transmission and reception units 68a and 68b read from the radio frame storage memories 63a and 63b, respectively, the radio frame data earlier by the radio transmission logic delay amount than a timing for starting the transmission of the radio frame data to the antennas 68a and 68b and supplies the same to the antennas 68a and 68b.

In this case, the reference counter 13 of the radio equipment control 10 serving as a master and the reference counter 62 of the radio equipment 60 serving as a slave are synchronized with each other. The synchronization of the reference counter 13 and the reference counter 62 is performed in the same manner as that of the first embodiment (S1 through S9 in FIG. 8), using, for example, the CPRI_LINK #1.

In order to make the head of the radio frame align at the positions of the antennas 68a and 68b of the radio equipment 60, the radio equipment 60 needs to know which position of the CPRI frame the head of the radio frames is stored.

Therefore, the baseband processing unit 11 of the radio equipment control 10 notifies the CPRI processing unit 12 of the head position of the radio frame in each of the CPRI_LINKs #1 and #2. Then, by using the vendor-specific region of the CPRI frame in each of the CPRI_LINKs #1 and #2, the CPRI processing unit 12 transmits the HFN value and the B_NO value of the head of the radio frame, which store the head position of the radio frame, to the radio equipment 60 (S8 and S9 in FIG. 8).

Distances from the radio equipment control 60 to the antennas 68a and 68b are different, and timings for transmitting the radio frame are different between the antennas 68a and 68b. Therefore, the radio equipment control 10 transmits the HFN value and the N_NO value of the CPRI frame, in which the IQ data of the head of the radio frame to be stored are different between the CPRI_LINKs #1 and #2, from the antennas 68a and 68b to the radio equipment 60.

Thus, the transmission timings of the radio frames at the antennas 68a and 68b can be synchronized with each other.

All examples and conditional language recited herein are intended for pedagogical purposes to aid the reader in understanding the present invention and the concepts contributed by the inventor to furthering the art, and are to be construed as being without limitation to such specifically recited examples and conditions, and the organization of such examples in the specification does not relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:

1. A radio base station apparatus comprising:
   a radio control device; and
   a plurality of radio devices coupled to the radio control device via a plurality of links through which data are transmitted and received in frames,
   the radio control device serves as a master including
      a first reference counter that counts a clock pulse of the radio control device;
      a first holding unit that holds a count value of the first reference counter as a first transmission value when a first specific frame is transmitted from the master to a slave;
      a second holding unit that holds a count value of the first reference counter as a first reception value when a second specific frame transmitted from the slave is received by the master; and
      a first transmitting unit that transmits the first transmission value and the first reception value from the master to the slave,
   one of the plurality of radio devices serves as the slave including
      a second reference counter that counts a clock pulse of the slave;
      a third holding unit that holds a count value of the second reference counter as a second reception value when the first specific frame transmitted from the master is received by the slave;
      a fourth holding unit that holds a count value of the second reference counter as a second transmission value when the second specific frame is transmitted from the slave to the master; and
      a synchronization unit that calculates a difference between the count values of the first reference counter and the second reference counter from the first and second transmission values and the first and second reception values, and corrects the count value of the second reference counter based on the difference in order to match the count value of the second reference counter to the count value of the first reference counter, the synchronization unit calculates the difference from $\{(1d-1b)-(1h-1e)\}/2$, where $1b$ denotes the first transmission value, $1h$ denotes the first reception value, $1e$ denotes the second transmission value, and $1d$ denotes second reception value.

2. The radio base station apparatus according to claim 1, wherein the radio control device further includes
   a fifth transmitting unit that transmits a head position of a radio frame from the master to the slave,
   wherein the slave transmits the head position of the radio frame received by the slave in accordance with a specified radio frame transmission cycle.

3. The radio base station apparatus according to claim 1, wherein the first reference counter outputs a count value based on a signal acquired from a global positioning system.

4. The radio base station apparatus according to claim 1, wherein the radio control device is star-connected to the plurality of radio devices.

5. The radio base station apparatus according to claim 1, wherein the radio control device is cascade-connected to the plurality of radio devices.

6. The radio base station apparatus according to claim 1, wherein the radio control device further includes
   a fifth transmitting unit that transmits information indicating a head position of a radio frame from the radio control device to the plurality of radio devices for each of the plurality of links,
   wherein each of the plurality of radio devices transmits the head position of the radio frame received thereby via a corresponding one of the plurality of links in accordance with a specified transmission cycle of the radio frame.

7. A synchronization method of a radio base station apparatus that connects a radio control device and plural radio devices to each other through plural links and transmits and receives data by using a frame, the synchronization method comprising:
   counting a clock pulse of the a radio control device or the radio device each serving that serves as a master with in a first reference counter;
   counting a clock pulse of the one of a plurality of radio device serving devices that serves as a slave with in a second reference counter, the radio control device and the plurality of radio devices are coupled via a plurality of links through which data are transmitted and received in frames;
   holding a count value of the first reference counter as a first transmission value when a first specific frame is transmitted from the master to the slave;
   holding a count value of the first reference counter as a first reception value when a second specific frame transmitted from the slave is received by the master;
   holding a count value of the second reference counter as a first second reception value when the first specific frame transmitted from the master is received by the slave;
   holding a count value of the second reference counter as a second transmission value when the second specific frame is transmitted from the slave to the master;
   holding a count value of the first reference counter as a second reception value when the second specific frame is received by the master;
   transmitting the first transmission value and the second first reception value from the master to the slave;
   calculating a difference between the first reference counter and the second reference counter from the first and second transmission values and the first and second reception values, the calculating calculates the difference from $\{(1d-1b)-(1h-1e)\}/2$, where $1b$ denotes the first transmission value, $1h$ denotes the first reception value, $1e$ denotes the second transmission value, and $1d$ denotes second reception value; and
   correcting the count value of the second reference counter based on the difference so as to make in order to match the count value of the second reference counter coincide with a to the count value of the first reference counter.

8. The synchronization method according to claim 7, further comprising:
   transmitting a head position of a radio frame from the master to the slave; and
   transmitting the head position of the radio frame received by the slave in accordance with a specified radio frame transmission cycle.

9. The radio base station apparatus as claimed in claim 1, wherein the synchronization unit sets the difference that is calculated in the second reference counter in order to match and synchronize the count value of the second reference counter to the count value of the first reference counter.

10. The synchronization method as claimed in claim 7, wherein the correcting sets the difference that is calculated by the calculating in the second reference counter in order to match and synchronize the count value of the second reference counter to the count value of the first reference counter.

* * * * *